(12) United States Patent
Kakumoto et al.

(10) Patent No.: US 7,068,312 B2
(45) Date of Patent: Jun. 27, 2006

(54) SOLID-STATE IMAGE-SENSING DEVICE

(75) Inventors: Tomokazu Kakumoto, Nagaokakyo (JP); Yoshio Hagihara, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 874 days.

(21) Appl. No.: 09/774,926

(22) Filed: Jan. 31, 2001

(65) Prior Publication Data

US 2001/0013571 A1 Aug. 16, 2001

(30) Foreign Application Priority Data

Feb. 10, 2000 (JP) .............................. 2000-038196
Feb. 25, 2000 (JP) .............................. 2000-054406
Mar. 29, 2000 (JP) .............................. 2000-095191

(51) Int. Cl.
*H04N 5/217* (2006.01)
*H04N 5/335* (2006.01)
*H01L 27/00* (2006.01)
*H01L 31/113* (2006.01)

(52) U.S. Cl. .................... 348/241; 348/308; 250/208.1; 257/291

(58) Field of Classification Search ............... 348/241, 348/243, 294, 301, 308, 303; 250/208.1, 250/339.02, 310, 370.08; 257/291
See application file for complete search history.

(56) References Cited

U.S. PATENT DOCUMENTS

| 4,973,833 A | | 11/1990 | Takada et al. | |
| 5,241,575 A | | 8/1993 | Miyatake et al. | |
| 6,128,039 A | * | 10/2000 | Chen et al. | ................ 348/294 |
| 6,476,864 B1 | * | 11/2002 | Borg et al. | ................ 348/245 |
| 6,498,332 B1 | * | 12/2002 | Funakoshi | ............... 250/208.1 |
| 6,507,519 B1 | * | 1/2003 | Collins et al. | ......... 365/185.28 |
| 6,587,142 B1 | * | 7/2003 | Kozlowski et al. | ......... 348/241 |

FOREIGN PATENT DOCUMENTS

JP 3-192764 A 8/1991

* cited by examiner

*Primary Examiner*—Lin Ye
(74) *Attorney, Agent, or Firm*—Sidley Austin LLP

(57) ABSTRACT

In a solid-state image-sensing device, first a switch Swa is turned on to sample and hold an image signal in a capacitor Ca, and then the switch Swa is turned off. Next, a switch SWb is turned on to sample and hold a noise signal in a capacitor Cb, and then the switch SWb is turned off. Next, switches SW1a and SW2a are turned on simultaneously so that the image signal in the capacitor Ca is fed through a buffer 6 to a capacitor Cc, and then the switches Sw1a and Sw2a are turned off. Then, a switch SW3 is turned on to reset the input side of the buffer 6. Next, switches SW1b and SW2b are turned on simultaneously so that the noise signal in the capacitor Cb is fed through the buffer to a capacitor Cd, and then the switches SW1b and SW2b are turned off. Then, the switch SW3 is turned on to reset the input side of the buffer 6 again.

3 Claims, 19 Drawing Sheets

SOLID-STATE IMAGE-SENSING DEVICE

This application is based on Japanese Patent Applications Nos. 2000-038196, 2000-054406, and 2000-095191 filed respectively on Feb. 10, 2000, Feb. 25, 2000, and Mar. 29, 2000, the contents of which are hereby incorporated by reference.

BACKGROUND OF THE INVENTION

1. Field of the Invention

The present invention relates to a solid-state image-sensing device in which variations in sensitivity among individual pixels are corrected.

2. Description of the Prior Art

Conventionally, a solid-state image-sensing device (hereinafter referred to as an "area sensor") having photosensitive elements such as photodiodes outputs, for each pixel, an image signal obtained from that pixel during an image sensing operation and a noise signal representing the variation in sensitivity of that pixel by way of an output signal line so that the variation in sensitivity of each pixel can be corrected by subtracting the noise signal from the image signal for that pixel. An example of such an area sensor is shown in FIG. 22.

The area sensor shown in FIG. 22 has pixels G11 to Gmn each having a photosensitive element such as a photodiode, signal lines 1-1 to 1-m connected, one for each column of the pixels G11 to Gmn, to the output-side ends of the pixels G11 to Gmn, and constant-current sources 2-1 to 2-m connected individually to the signal lines 1-1 to 1-m. That is, the output of the pixel Gab (wherein "a" represents a natural number fulfilling $1 \leq a \leq m$ and "b" represents a natural number fulfilling $1 \leq b \leq m$) is output by way of the signal line 1-a and is amplified by the constant-current source 2-a connected to that signal line 1-a.

To the signal lines 1-1 to 1-m, switches S1-1 to S1-m and switches S2-1 to S2-m are connected individually. Through the switches S1-1 to S1-m, the image signals from the signal lines 1-1 to 1-m are fed to capacitors C1-1 to C1-m, respectively. On the other hand, through the switches S2-1 to S2-m, the noise signals from the signal lines 1-1 to 1-m are fed to capacitors C2-1 to C2-m, respectively. The image signals fed to the capacitors C1-1 to C1-m so as to be "sampled and held" therein are fed through buffers 20-1 to 20-m to the non-inverting input terminal of a differential amplifier 22. On the other hand, the noise signals fed to the capacitors C2-1 to C2-m so as to be "sampled and held" therein are fed through buffers 21-1 to 21-m to the inverting input terminal of the differential amplifier 22.

The buffers 20-1 to 20-m and 21-1 to 21-m are each composed of MOS transistors as shown in FIG. 23. Specifically, the buffer 20 (corresponding to the buffers 20-1 to 20-m and 21-1 to 21-m shown in FIG. 22) is composed of an N-channel MOS transistor Q1 having its gate connected to the node between the switch S (corresponding to the switches S1-1 to S1-m and S2-1 to S2-m shown in FIG. 22) and the capacitor C (corresponding to the capacitors C1-1 to C1-m and C2-1 to C2-m shown in FIG. 22), an N-channel MOS transistor Q2 having its drain connected to the source of the MOS transistor Q1, and an N-channel MOS transistor Q3 having its drain connected to the source of the MOS transistor Q2.

The MOS transistor Q1 receives at its drain a direct-current voltage VDD. The MOS transistor Q2 receives at its gate a pulse signal φP, and thus functions as a switch. The MOS transistor Q3 receives at its gate a direct-current voltage and at its source a direct-current voltage VSS, and thus functions as a constant-current source. The output of the buffer 20 is extracted from the node between the source of the MOS transistor Q2 and the drain of the MOS transistor Q3.

In this conventional area sensor, the switches S1-1 to S1-m and S2-1 to S2-m, the capacitors C1-1 to C1-m and C2-1 to C2-m, the buffers 20-1 to 20-m and 21-1 to 21-m, and the differential amplifier 22, which together constitute an output circuit for handling the signals from the individual columns, operate as shown in a timing chart in FIG. 24.

First, when the pixels G1k to Gmk (where "k" represents a natural number fulfilling $1 \leq k \leq n$), which feed their outputs to the signal lines 1-1 to 1-m, output image signals, then, as shown in FIG. 24, the switches S1-1 to S1-m are turned on, so that the image signals are fed to the capacitors C1-1 to C1-m so as to be sampled and held therein. Meanwhile, the switches S2-1 to S2-m and the MOS transistors Q2 provided in the buffers 20-1 to 20-m and 21-1 to 21-m remain off. When the image signals have been sampled and held in the capacitors C1-1 to C1-m in this way, the switches S1-1 to S1-m are turned off.

Next, when the pixels G1k to Gmk output noise signals, then the switches S2-1 to S2-m are turned on, so that the noise signals are fed to the capacitors C2-1 to C2-m so as to be sampled and held therein. Meanwhile, the switches S1-1 to S1-m and the MOS transistors Q2 provided in the buffers 20-1 to 20-m and 21-1 to 21-m remain off. When the noise signals have been sampled and held in the capacitors C2-1 to C2-m in this way, the switches S2-1 to S2-m are turned off.

Now that the image signals from the pixels G1k to Gmk are sampled and held in the capacitors C1-1 to C1-m and the noise signals from the pixels G1k to Gmk are sampled and held in the capacitors C2-1 to C2-m, the pulse signal φP is fed to the gates of the MOS transistors Q2 provided in the buffers 20-1 and 21-1 so that these MOS transistors Q2 are turned on. This causes the image and noise signals from the pixel G1k to be fed to the non-inverting and inverting input terminals, respectively, of the differential amplifier 22, which thus outputs at its output terminal a signal equal to the noise signal subtracted from the image signal. That is, the image signal is output after being corrected for the noise component included therein because of the variation in sensitivity of the pixel G1k. Next, the pulse signal φP is fed to the gates of the MOS transistors Q2 provided in the buffers 20-1 and 21-1 so that these MOS transistors Q2 are turned on. This causes the differential amplifier 22 to output the image signal that has been corrected for the noise component included therein because of the variation in sensitivity of the pixel G1k.

Similarly, the pulse signal φP is fed sequentially to the gates of the MOS transistors Q2 provided in the buffers 20-3 to 20-m and 21-3 to 21-m, so that the differential amplifier 22 sequentially outputs the image signals from the pixels G3k to Gmk after correcting them for the variations in sensitivity among those pixels. When the differential amplifier 22 completes sequential output of the image signals from the pixels G1k to Gmk with due correction, it goes on to output the image signals from the pixels G1(k+1) to Gm(k+1) in a similar manner.

However, as shown in FIG. 22, in this circuit configuration, the image and noise signals from each pixel are fed through separate buffers to the differential amplifier. Thus, variations in the characteristics of the constituent circuit components between the buffers handling image signals and the buffers handling noise signals cause variations, from one column to another, in the degree to which the image signals from the pixels are corrected. That is, whereas the MOS transistors Q1 provided in the buffers are formed as source-follower transistors, the MOS transistors Q3 provided therein so as to function as constant-current sources exhibit variations in their characteristics, which cause variations in the amplification factor of the individual buffers. As a result, the image signals output from buffers having one amplification factor are corrected with the noise signals output from buffers having a different amplification factor; that is, the image signals are corrected to uneven degrees column by column. When the image signals output from the differential amplifier are reproduced as an image, such variations in the degree of correction effected appear as vertical stripes in the reproduced image.

SUMMARY OF THE INVENTION

An object of the present invention is to provide a solid-state image-sensing device in which variations in sensitivity among individual pixels are corrected by feeding the image signals and the noise signals output from the pixels belonging to an identical column to a correction circuit by way of a single signal line.

Another object of the present invention is to provide a solid-state image-sensing device that permits cancellation of the fixed-pattern noise that appears in the output signal of the solid-state image-sensing device because of its circuit configuration or the like.

To achieve the above objects, according to the present invention, a solid-state image-sensing device is provided with: a plurality of pixels arranged in a matrix and each generating an electric signal proportional to the amount of incident light; a plurality of selector circuits provided one for each column of the matrix of the pixels and each having a single buffer so that the selector circuits each receive, from a plurality of pixels belonging to a corresponding column of the matrix, image signals and noise signals representing variations in sensitivity and then output the image signals and the noise signals alternately through the single buffer; and a correction circuit receiving the image signals and the noise signals sequentially from one selector circuit after another and correcting the image signals on the basis of the noise signals.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

First Embodiment

Figure 1:
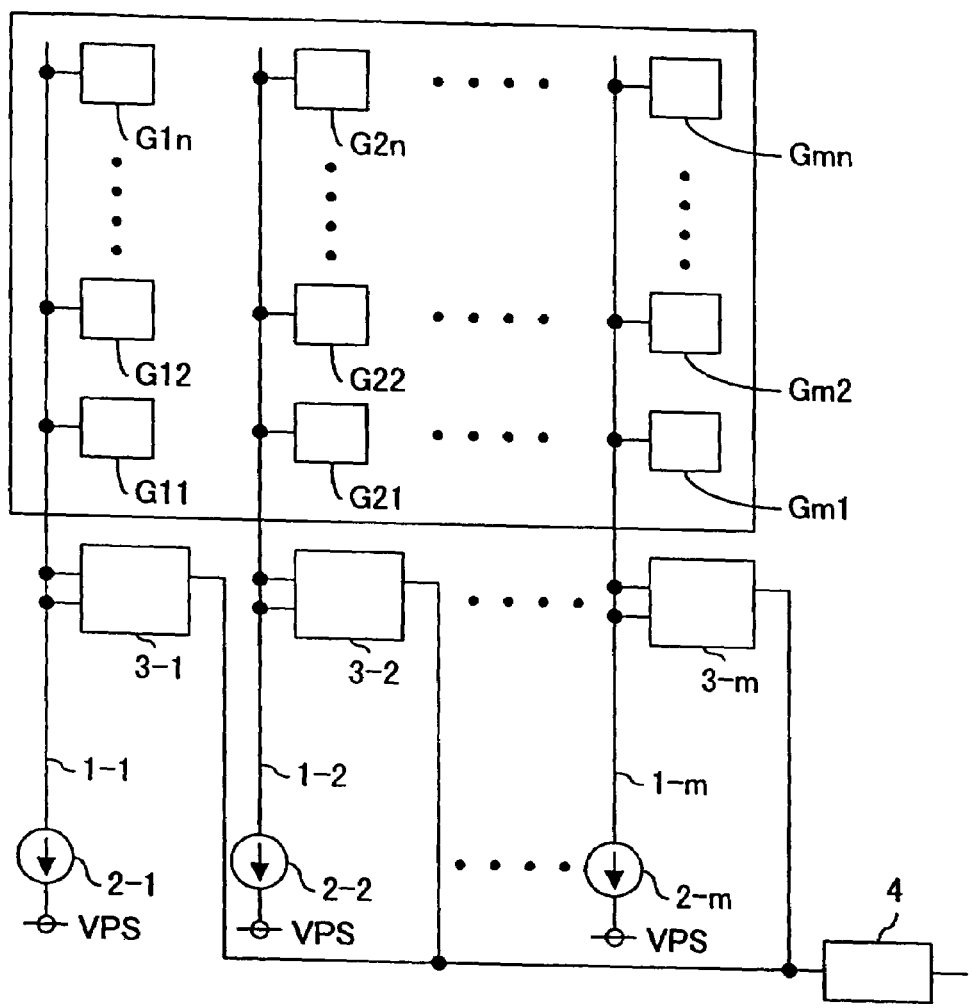
FIG. 1 is a block diagram showing the internal configuration of the area sensor of a first embodiment of the invention.

First, the area sensor of a first embodiment of the present invention will be described with reference to the drawings. FIG. 1 is a block diagram showing the configuration of the area sensor of this embodiment.

1. Configuration of the Area Sensor

Figure 22:
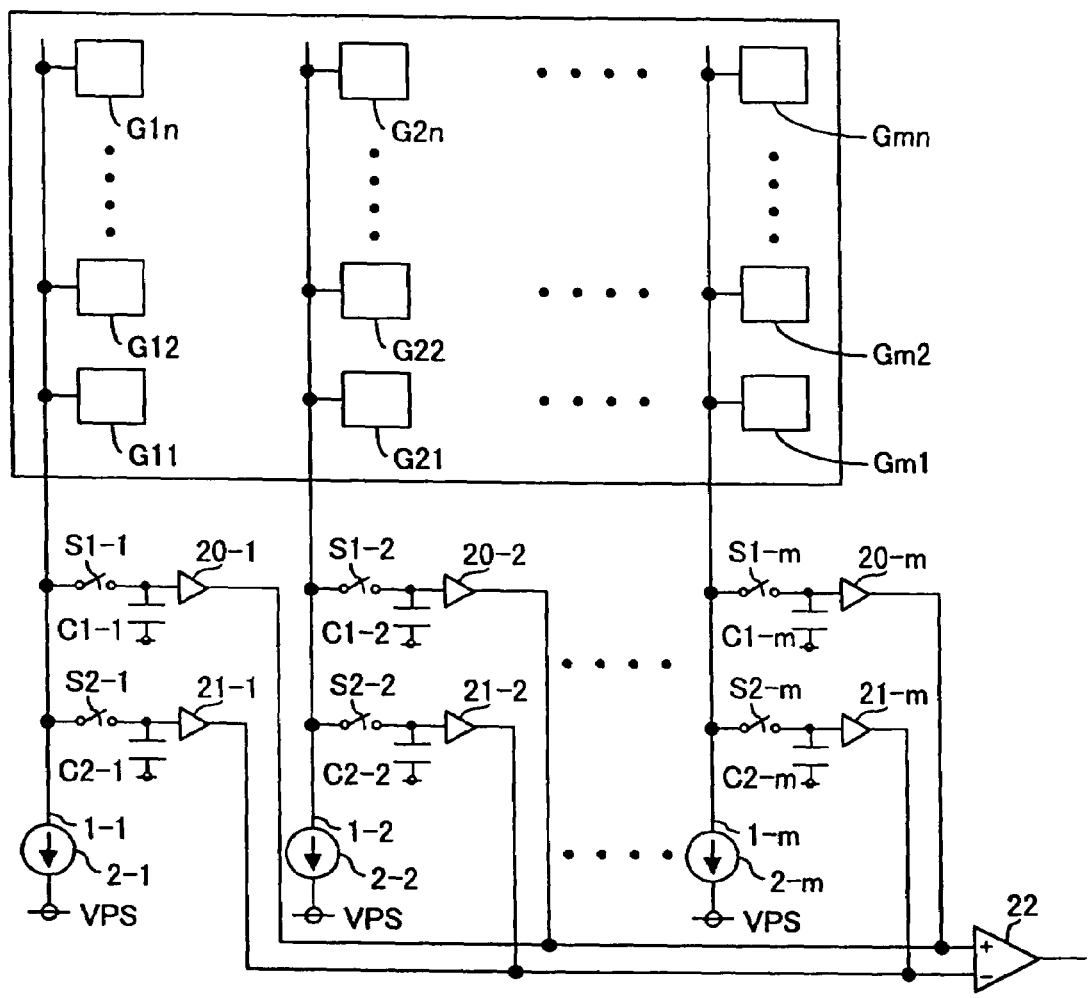
FIG. 22 is a block diagram showing the internal configuration of a conventional area sensor.
Figure 23:
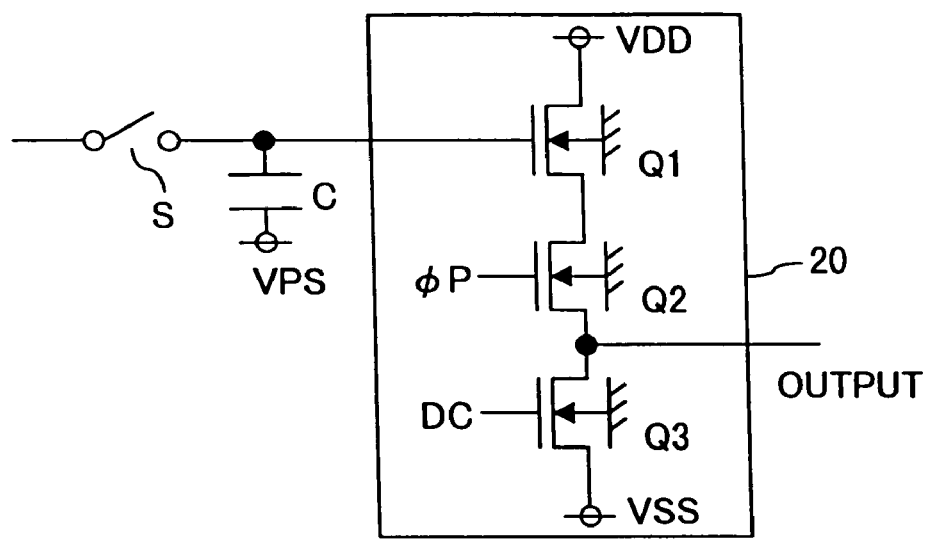
FIG. 23 is a circuit diagram showing the internal configuration of each buffer provided in the conventional area sensor shown in FIG. 22.
Figure 24:
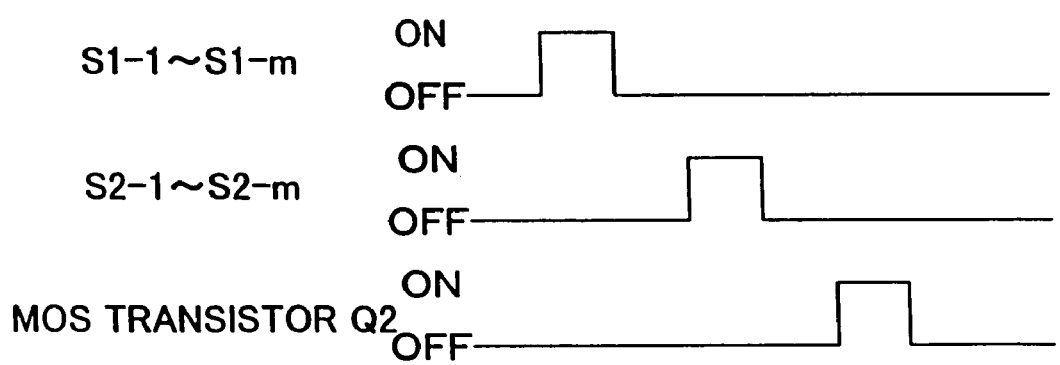
FIG. 24 is a timing chart showing the operation of the relevant circuit components of the conventional area sensor shown in FIG. 22.

FIG. 1 is a block diagram showing the configuration of the area sensor of this embodiment. In the following descriptions, such elements as serve the same purposes as in the area sensor shown in FIG. 22 are identified with the same reference symbols, and their detailed descriptions will not be repeated.

The area sensor shown in FIG. 1 has pixels G11 to Gmn, signal lines 1-1 to 1-m connected, one for each column of the pixels G11 to Gmn, to the output-side ends of the pixels G11 to Gmn, constant-current sources 2-1 to 2-m connected individually to the signal lines 1-1 to 1-m, selector circuits 3-1 to 3-m that individually choose between the image signals and the noise signals fed thereto from the pixels G11 to Gmn so as to output either the image signals or the noise signals at a given time, and a correction circuit 4 that corrects the image signals output from the selector circuits 3-1 to 3-m on the basis of the noise signals output from the selector circuits 3-1 to 3-m. A direct-current voltage is applied to one end of each of the constant-current sources 2-1 to 2-m. Both the image signals and the noise signals output from the selector circuits 3-1 to 3-m are fed to the correction circuit 4 by way of a single signal path.

In this area sensor, the constant-current sources 2-1 to 2-m amplify the outputs of the pixels G11 to Gmn that appear on the signal lines 1-1 to 1-m, respectively. The image signals and the noise signals appearing on the signal lines 1-1 to 1-m are obtained sequentially, pixel by pixel, from the pixels G11 to G1n, G21 to G2n, . . . , Gm1 to Gmn that are connected collectively, column by column, to the signal lines 1-1 to 1-m, respectively. The image signals and the noise signals output from one pixel after another are sequentially fed to the selector circuits 3-1 to 3-m so as to be sampled and held therein.

Then, the image signals and the noise signals thus sampled and held in the selector circuits 3-1 to 3-m are, in order of arrangement of the selector circuits 3-1, 3-2, . . . , 3-m and, within each selector circuit, in order of first the image signals and then the noise signals, fed to the correction circuit 4. The correction circuit 4 first samples and holds the image signals and the noise signals thus received, and then subtracts the noise signals from the image signals to correct variations in sensitivity among the individual pixels. Here, the correction operation is performed on the image signals and the noise signals from one selector circuit at a time in order of arrangement of the selector circuits 3-1, 3-2, . . . , 3-m.

2. First Example of Pixel Configuration

An example of the configuration of each of the pixels G11 to Gmn provided in the area sensor shown in FIG. 1 will be described below with reference to FIG. 2. In the pixel shown in FIG. 2, a direct-current voltage VPS is applied to the anode of a photodiode PD, of which the cathode is connected to the gate of a MOS transistor T1. The source of this MOS transistor T1 is connected to the drain of the MOS transistor T2. The gate of the MOS transistor T1 is connected to the source of a MOS transistor T3, and the source of the MOS transistor T2 is connected to a signal line 1 (corresponding to the signal lines 1-1 to 1-m shown in FIG. 1). The MOS transistors T1 to T3 are all N-channel MOS transistors having their back gates grounded.

The MOS transistor T1 receives at its drain a direct-current voltage VPD, and the MOS transistor T3 receives at its drain a direct-current voltage VD. Moreover, the MOS transistor T2 receives at its gate a signal $\phi V$, and the MOS transistor T3 receives at its gate a signal $\phi RS$. In this pixel configured as described above, the source of the MOS transistor T1 is connected, through the MOS transistor T2 and the signal line 1, to one end of a constant-current source 2 (corresponding to the constant-current sources 2-1 to 2-m shown in FIG. 1), which receives at the other end a direct-current voltage VPS. Thus, when the MOS transistor T2 is on, the MOS transistor T1 operates as a source-follower MOS transistor, causing a signal amplified by the constant-current source 2 to appear on the signal line 1. How this pixel configured as described above operates in an image sensing operation and in a sensitivity variation detection operation will be described below.

(1) Image Sensing Operation (When Image Signals are Output)

Figure 2:
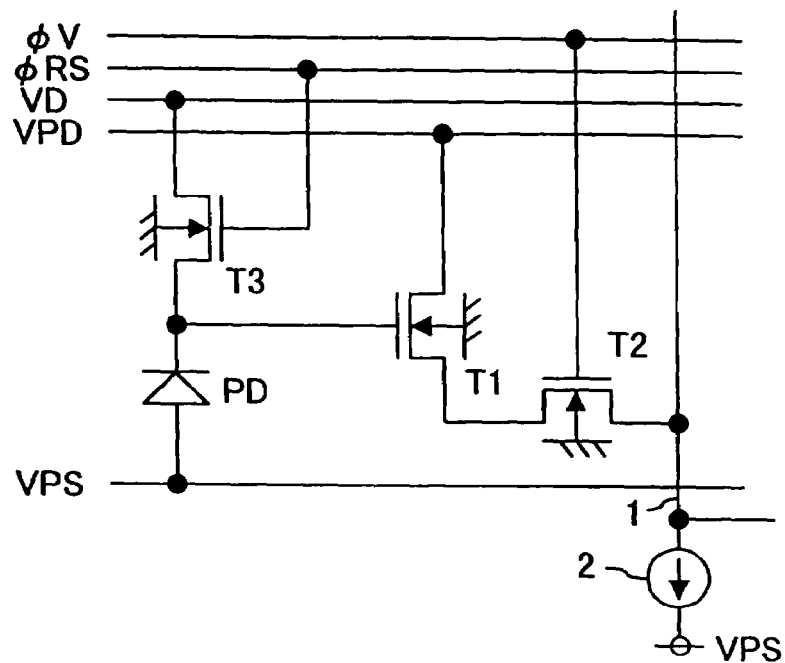
FIG. 2 is a circuit diagram showing an example of pixel configuration in the area sensor shown in FIG. 1.

First, how the pixel configured as shown in FIG. 2 operates in an image sensing operation will be described. During an image sensing operation, the signal $\phi RS$ remains at a low level, and the MOS transistor T2 remains off. In this state, when light is incident on the photodiode PD, a photocurrent appears therein, and thus electric charge is accumulated at the gate of the MOS transistor T1. As a result, as the photocurrent flows out of the photodiode PD, the gate voltage of the MOS transistor T1 becomes lower.

When the pulse signal $\phi V$ is fed to the MOS transistor T2, the MOS transistor T1 outputs, as an output current, its source current, which is proportional to its gate voltage, through the MOS transistor T2 to the signal line 1. Here, the MOS transistor T1 operates as a source-follower MOS transistor, and therefore an image signal appears as a voltage signal on the signal line 1. Subsequently, the signal $\phi V$ is turned to a low level to turn the MOS transistor T2 off. Thus, the image signal output through the MOS transistors T1 and T2 is proportional to the amount of electric charge accumulated at the gate of the MOS transistor T1, and is therefore linearly proportional to the amount of light incident on the photodiode PD.

(2) Sensitivity Variation Detection Operation (When Noise Signals are Output)

Next, how the same pixel operates in a sensitivity variation detection operation will be described. As described above, when the MOS transistor T2 is turned on and an image signal is output from the pixel to the signal line 1, the MOS transistor T2 is turned off. Then, the signal $\phi RS$ is turned to a high level to turn the MOS transistor T3 on, so that the direct-current voltage VD is applied to the gate of the MOS transistor T1. In this way, the gate voltage of the MOS transistor T1 of each pixel can be forcibly made uniformly equal to the voltage VD.

Thus, when the pulse signal $\phi V$ is fed to the gate of the MOS transistor T2 to turn this MOS transistor T2 on, an output current representing the variation in the amplification factor of the MOS transistor T1, i.e. what causes the variation in sensitivity of this particular pixel, is output to the signal line 1. Here, the MOS transistor T1 operates as a source-follower MOS transistor, and therefore a noise signal appears as a voltage signal on the signal line 1. Subsequently, the signal $\phi V$ is turned to a low level to turn the MOS transistor T2 off and simultaneously the signal $\phi RS$ is turned to a low level to turn the MOS transistor T3 off in preparation for the next image sensing operation.

3. Second Example of Pixel Configuration

Another example of the configuration of each of the pixels G11 to Gmn provided in the area sensor shown in FIG. 1 will be described below with reference to FIG. 3. In the pixel shown in FIG. 3, a direct-current voltage VPD is applied to the cathode of a photodiode PD, of which the anode is connected to the drain of a MOS transistor T4. The source of this MOS transistor T4 is connected to the gate and drain of a MOS transistor T5 and also to the gate of a MOS transistor T1. The source of the MOS transistor T1 is connected to the drain of a MOS transistor T2, and the drain of the MOS transistor T2 is connected to a signal line 1

(corresponding to the signal lines 1-1 to 1-m shown in FIG. 1). The MOS transistors T1 to T5 are all N-channel MOS transistors having their back gates grounded.

The MOS transistor T5 receives at its source a signal φVPS, and the MOS transistor T2 receives at its gate a signal φV. Moreover, the MOS transistor T4 receives at its gate a signal φS, and the MOS transistor T1 receives at its drain a direct-current voltage VPD. In this pixel configured as described above, the source of the MOS transistor T1 is connected, through the MOS transistor T2 and the signal line 1, to one end of a constant-current source 2 (corresponding to the constant-current sources 2-1 to 2-m shown in FIG. 1), which receives at the other end a direct-current voltage VPS. Thus, when the MOS transistor T2 is on, the MOS transistor T1 operates as a source-follower MOS transistor, causing a signal amplified by the constant-current source 2 to appear on the signal line 1.

This pixel configured as described above operates in an image sensing operation and in a sensitivity variation detection operation in the following manners. Here, the signal φVPS is a binary voltage signal that is either at a high level that causes the MOS transistor T5 to operate in a subthreshold region or at a low level that is lower than this high level and causes a higher current to flow through the MOS transistor T5 than when it is fed with a high level as the signal φVPS.

(1) Image Sensing Operation (When Image Signals are Output)

Figure 3:
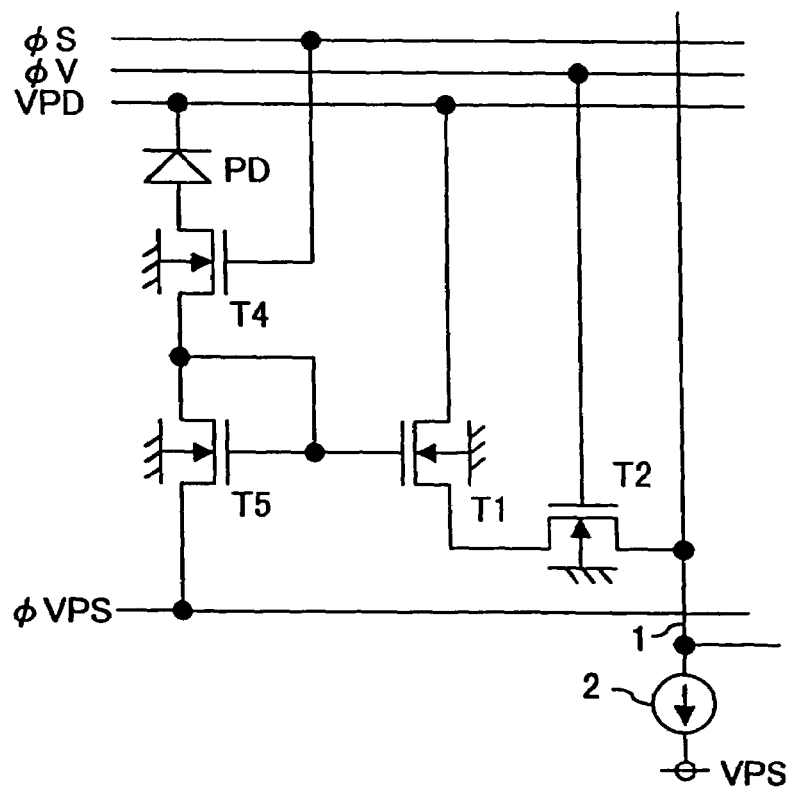
FIG. 3 is a circuit diagram showing another example of pixel configuration in the area sensor shown in FIG. 1.

First, how the pixel configured as shown in FIG. 3 operates in an image sensing operation will be described. During an image sensing operation, the signal φS remains at a high level, and therefore the MOS transistor T4 remains on. Moreover, to permit the MOS transistor T5 to operate in a subthreshold region, the signal φVPS fed to the source of the MOS transistor T5 is kept at a high level. In this state, when light is incident on the photodiode PD, a photocurrent appears therein, and, due to the threshold characteristics of a MOS transistor, a voltage natural-logarithmically proportional to the photocurrent appears at the gates of the MOS transistors T5 and T1.

When the pulse signal φV is fed to the MOS transistor T2, the MOS transistor T1 outputs, as an output current, its source current, which is proportional to its gate voltage, through the MOS transistor T2 to the signal line 1. Here, the MOS transistor T1 operates as a source-follower MOS transistor, and therefore an image signal appears as a voltage signal on the signal line 1. Subsequently, the signal φV is turned to a low level to turn the MOS transistor T2 off. Thus, the image signal output through the MOS transistors T1 and T2 is proportional to the gate voltage of the MOS transistor T1, and is therefore natural-logarithmically proportional to the amount of light incident on the photodiode PD.

(2) Sensitivity Variation Detection Operation (When Noise Signals are Output)

Figure 4:
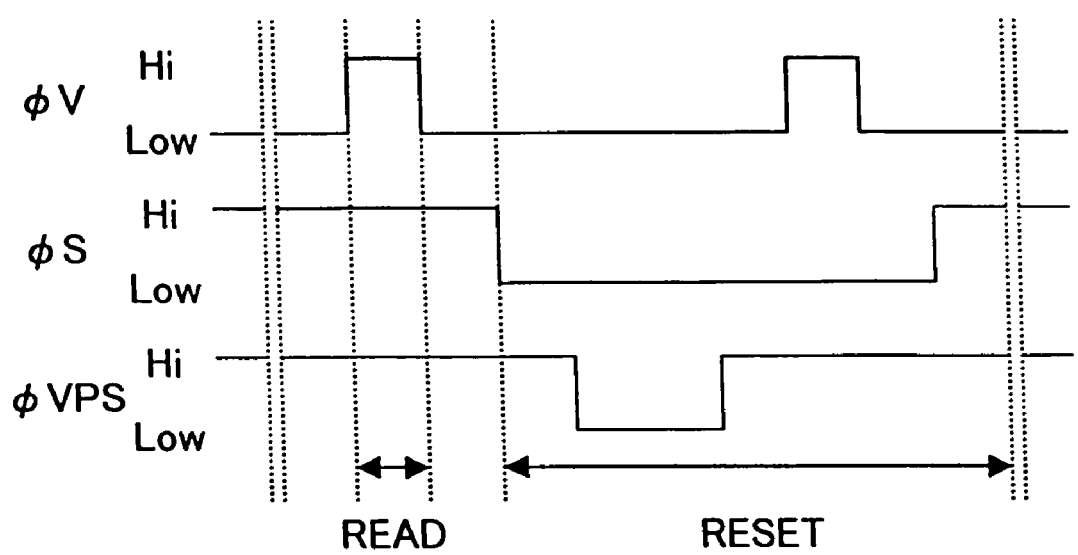
FIG. 4 is a timing chart showing the behavior of the relevant signals in the pixel shown in FIG. 3 during an sensitivity variation detection operation.

Next, how the same pixel operates in a sensitivity variation detection operation will be described with reference to a timing chart shown in FIG. 4. First, after an image signal has been output in response to the pulse signal φV, the signal φS is turned to a low level to turn the MOS transistor T4 off. This starts a resetting operation. Here, negative electric charge flows into the MOS transistor T5 through its source, and is recombined with the positive electric charge accumulated at the gate and drain of the MOS transistor T5 and at the gate of the MOS transistor T1. This causes the potential at the gate and drain of the MOS transistor T5 to lower to a certain degree.

However, as the potential at the gate and drain of the MOS transistor T5 lowers to a certain degree, the resetting operation slows down. This slowing down is particularly remarkable when a bright subject suddenly becomes dim. To avoid this, next, the signal φVPS fed to the source of the MOS transistor T5 is turned to a low level. Lowering the source voltage of the MOS transistor T5 in this way increases the amount of negative electric charge that flows into the MOS transistor T5 through its source. This ensures prompt recombination of the positive electric charge accumulated at the gate and drain of the MOS transistor and at the gate of the MOS transistor T1.

Thus, the potential at the gate and drain of the MOS transistor T5 lowers further. Then, by turning the signal φVPS fed to the source of the MOS transistor T5 to a high level, the MOS transistor T5 is brought back into its original potential state. After the MOS transistor T5 has been brought back into its original potential state in this way, the pulse signal φV is fed to the gate of the MOS transistor T2 to turn this MOS transistor T2 on, so that an output current representing the variation in sensitivity of this particular pixel due to variations in the characteristics of the MOS transistors T1 and T5 is output to the signal line 1.

Here, the MOS transistor T1 operates as a source-follower MOS transistor, and therefore a noise signal appears as a voltage signal on the signal line 1. Subsequently, the signal φV is turned to a low level to turn the MOS transistor T2 off, and then the signal φS is turned to a high level to bring the MOS transistor T4 into a conducting state in preparation for an image sensing operation.

4. Configuration and Operation of the Selector and Correction Circuits

Figure 5:
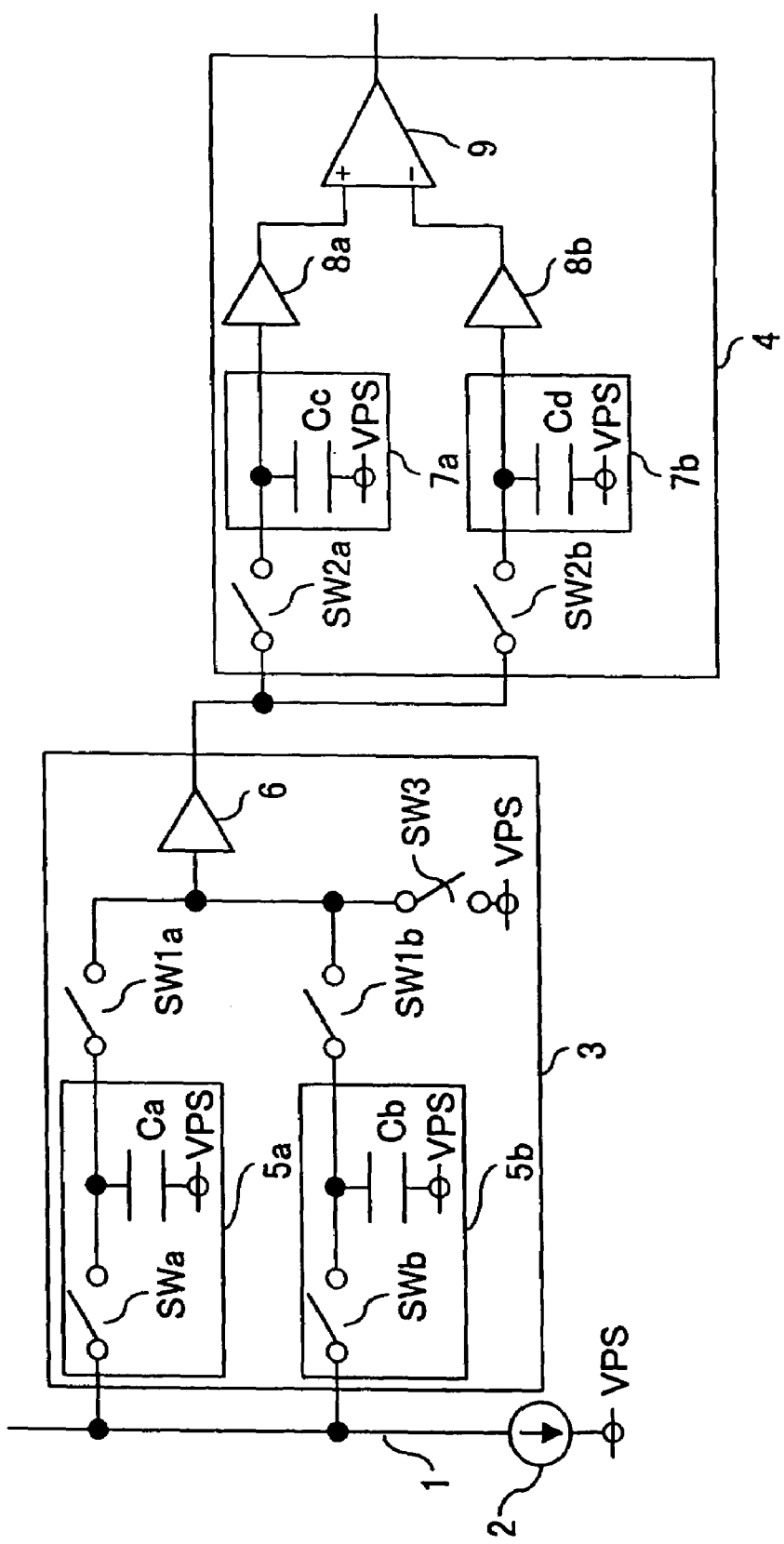
FIG. 5 is a block diagram showing an example of the internal configuration of the selector circuit and the correction circuit provided in the area sensor shown in FIG. 1.
Figure 6:
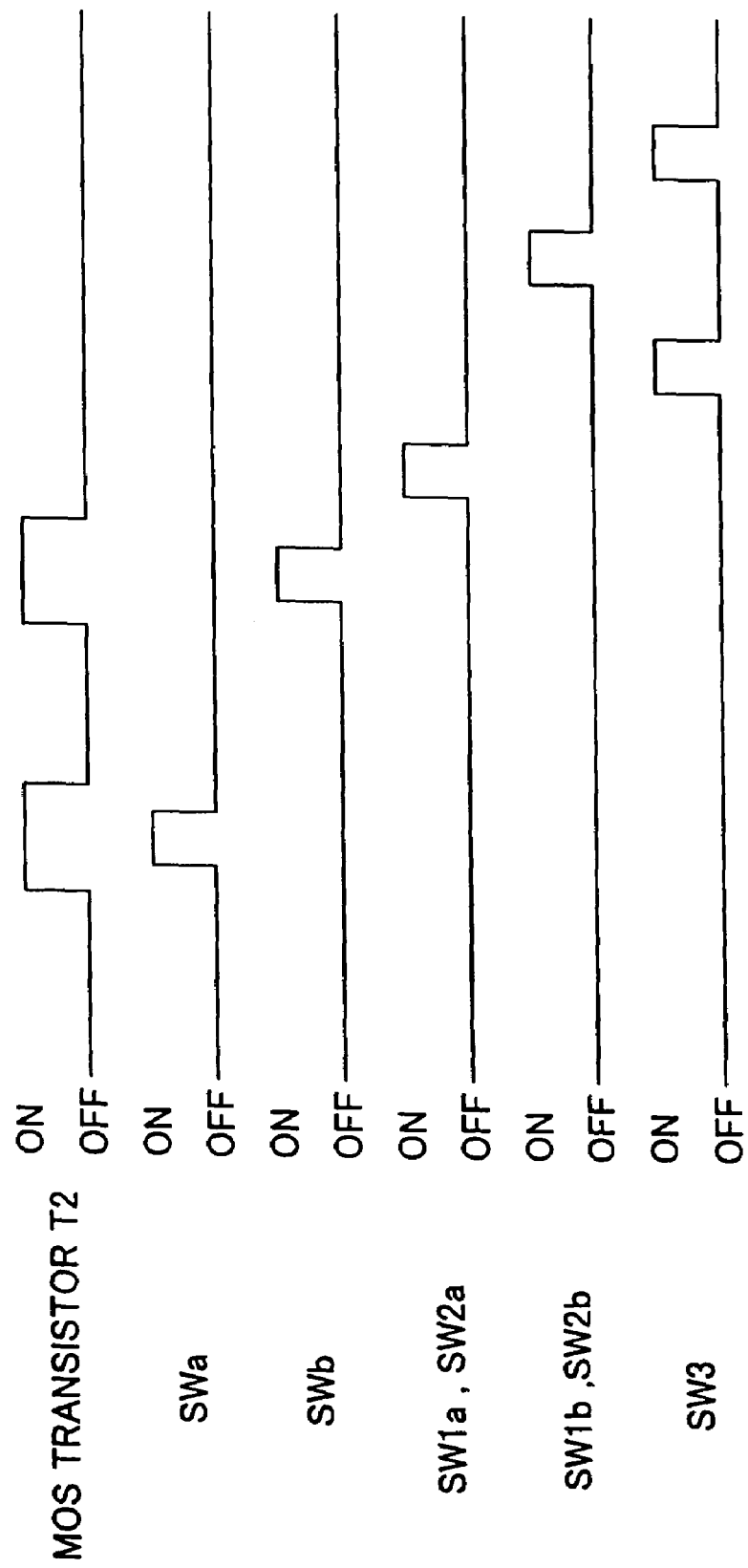
FIG. 6 is a timing chart showing the operation of the relevant circuit components of the selector circuit and the correction circuit shown in FIG. 5.

FIG. 5 is a circuit block diagram showing the internal configuration of the selector circuit and the correction circuit provided in the area sensor shown in FIG. 1. FIG. 6 is a timing chart showing the operation of the relevant circuit components provided in the area sensor of this embodiment.

The selector circuit 3 shown in FIG. 5 (corresponding to the selector circuits 3-1 to 3-m shown in FIG. 1) has a holding circuit 5a for sampling and holding an image signal fed from a signal line 1 (corresponding to the signal lines 1-1 to 1-m shown in FIG. 1), a holding circuit 5b for sampling and holding a noise signal fed from the signal line 1, switches SW1a and SW1b each having one end connected to the output side of the holding circuit 5a or 5b, respectively, a switch SW3 having one end connected to the other end of each of the switches SW1a and SW1b, and a buffer 6 having its input side connected to the node at which the switches SW1a, SW1b, and SW3 are connected together. To the other end of the switch SW3, the direct-current voltage VPS is applied.

On the other hand, the correction circuit 4 shown in FIG. 5 has switches SW2a and SW2b each having one end connected to the output side of the buffer 6, a holding circuit 7a connected to the other end of the switch SW2a, a holding circuit 7b connected to the other end of the switch SW2b, buffers 8a and 8b having their input sides connected to the output sides of the holding circuits 7a and 7b, respectively, and a differential amplifier 9 having its non-inverting and inverting input terminals connected to the output sides of the buffers 8a and 8b, respectively.

The holding circuits 5a and 5b are each composed of a switch SWa or SWb, respectively, having one end connected to the signal line 1, and a capacitor Ca or Cb, respectively, having one end connected to the other end of the switch SWa or SWb and receiving at the other end the direct-current voltage VPS. On the other hand, the holding circuits 7a and 7b are each composed of a capacitor Cc or Cd, respectively, having one end connected to the other end of the switch SW2a or SW2b and receiving at the other end the direct-current voltage VPS.

Now, how the area sensor having the selector circuit 3 and the correction circuit 4 thereof configured as described above operates will be described with reference to a timing chart shown in FIG. 6. First, in each of the pixels G1k to Gmk (where "k" represents a natural number fulfilling $1 \leq k \leq n$), the MOS transistor T2 (see FIG. 2 or 3) is turned on, so that the image signals output from those pixels are fed by way of the signal lines 1-1 to 1-m (FIG. 1) to the selector circuits 3-1 to 3-m (FIG. 1). In this state, the switch SWa is turned on, so that the image signals from the pixels G1k to Gmk are sampled and held in the capacitor Ca of the holding circuit 5a in each of the selector circuits 3-1 to 3-m. Then, the switch SWa is turned off.

When the pixels G1k to Gmk complete outputting their image signals in this way, then they detect variations in sensitivity among them. Then, the MOS transistor T2 is turned on, so that the outputs obtained from the pixels G1k to Gmk during this detection are, as the noise signals from those pixels G1k to Gmk, fed by way of the signal lines 1-1 to 1-m to the selector circuits 3-1 to 3-m. In this state, the switch SWb is turned on, so that the noise signals from the pixels G1k to Gmk are sampled and held in the capacitor Cb of the holding circuit 5b in each of the selector circuits 3-1 to 3-m. Then, the switch SWb is turned off.

In this way, the image and noise signals from the pixels G1k to Gmk are sampled and held in the holding circuits 5a and 5b in the selector circuits 3-1 to 3-m, respectively. Then, the switch SW1a of the selector circuit 3-1 and the switch SW2a of the correction circuit 4 are turned on. This causes the image signal from the pixel G1k sampled and held in the holding circuit 5a of the selector circuit 3-1 to be fed from the capacitor Ca of the holding circuit 5a through the switch SW1a, the buffer 6, and the switch SW2a to the capacitor Cc of the holding circuit 7a. In this way, the image signal from the pixel G1k is sampled and held in the holding circuit 7a, and is simultaneously fed through the buffer 8a to the non-inverting input terminal of the differential amplifier 9. Then, the switches SW1a and SW2a are turned off.

When the image signal from the pixel G1k is sampled and held in the holding circuit 7a, the switch SW3 is turned on, so that the voltage appearing at the node between the switches SW1a and SW1b, i.e. the input side of the buffer 6, is reset. When the input side of the buffer 6 is reset in this way, the switch SW3 is turned off.

Next, the switch SW1b of the selector circuit 3-1 and the switch SW2b of the correction circuit 4 are turned on. This causes the noise signal from the pixel G1k sampled and held in the holding circuit 5b of the selector circuit 3-1 to be fed from the capacitor Cb of the holding circuit 5b through the switch SW1b, the buffer 6, and the switch SW2b to the capacitor Cd of the holding circuit 7b. In this way, the noise signal from the pixel G1k is sampled and held in the holding circuit 7b, and is simultaneously fed through the buffer 8b to the inverting input terminal of the differential amplifier 9. Then, the switches SW1b and SW2b are turned off.

When the noise signal from the pixel G1k is sampled and held in the holding circuit 7b, the switch SW3 is turned on again, so that the voltage appearing at the node between the switches SW1a and SW1b, i.e. the input side of the buffer 6, is reset. When the input side of the buffer 6 is reset in this way, the switch SW3 is turned off.

When the image and noise signals from the pixel G1k are fed to the non-inverting and inverting input terminals of the differential amplifier 9, the noise signal is subtracted from the image signal, and thus the correction circuit 4 outputs the resulting signal, i.e. the image signal corrected for the variation in sensitivity of this particular pixel. On completion of output of this sensitivity-variation-corrected image signal from the pixel G1k, then the selector circuit 3-2, in which the image and noise signals from the pixel G2k are sampled and held, and the correction circuit 4 operate in the same manner as described above, so that the correction circuit 4 outputs the sensitivity-variation-corrected image signal from the pixel G2k. Thereafter, the selector circuits 3-3 to 3-m operate successively together with the correction circuit 4 in the same manner as described above, so that the correction circuit 4 sequentially outputs the sensitivity-variation-corrected image signals from the pixels G3k to Gmk.

When the correction circuit 4 completes sequential output of the sensitivity-variation-corrected image signals from the pixels G1k to Gmk in this way, then the image and noise signals from the pixels G1(k+1) to Gm(k+1) are sampled and held in the holding circuits 5a and 5b in the selector circuits 3-1 to 3-m. Then, the correction circuit 4 sequentially outputs the sensitivity-variation-corrected image signals from the pixels G1k to Gmk. In this way, the image signals from the pixels G11 to Gmn are output, pixel by pixel, after being corrected for variations in sensitivity among the individual pixels on the basis of the noise signals from the respective pixels G11 to Gmn.

As described above, whatever current signal is output from a given pixel, whether it is an image signal or a noise signal, is voltage-amplified with a single constant-current source. Moreover, when an image signal and a noise signal from a given pixel are fed to the correction circuit so as to be sampled and held therein, those image and noise signals are fed to the holding circuits through a single buffer. In this way, the image and noise signals that the differential amplifier receives from a given pixel to subtract the latter from the former are amplified with a single constant-current source and fed thereto through a single buffer. This makes it possible to eliminate variations in sensitivity among different columns due to variations in the characteristics of individual constant-current sources.

Figure 7:
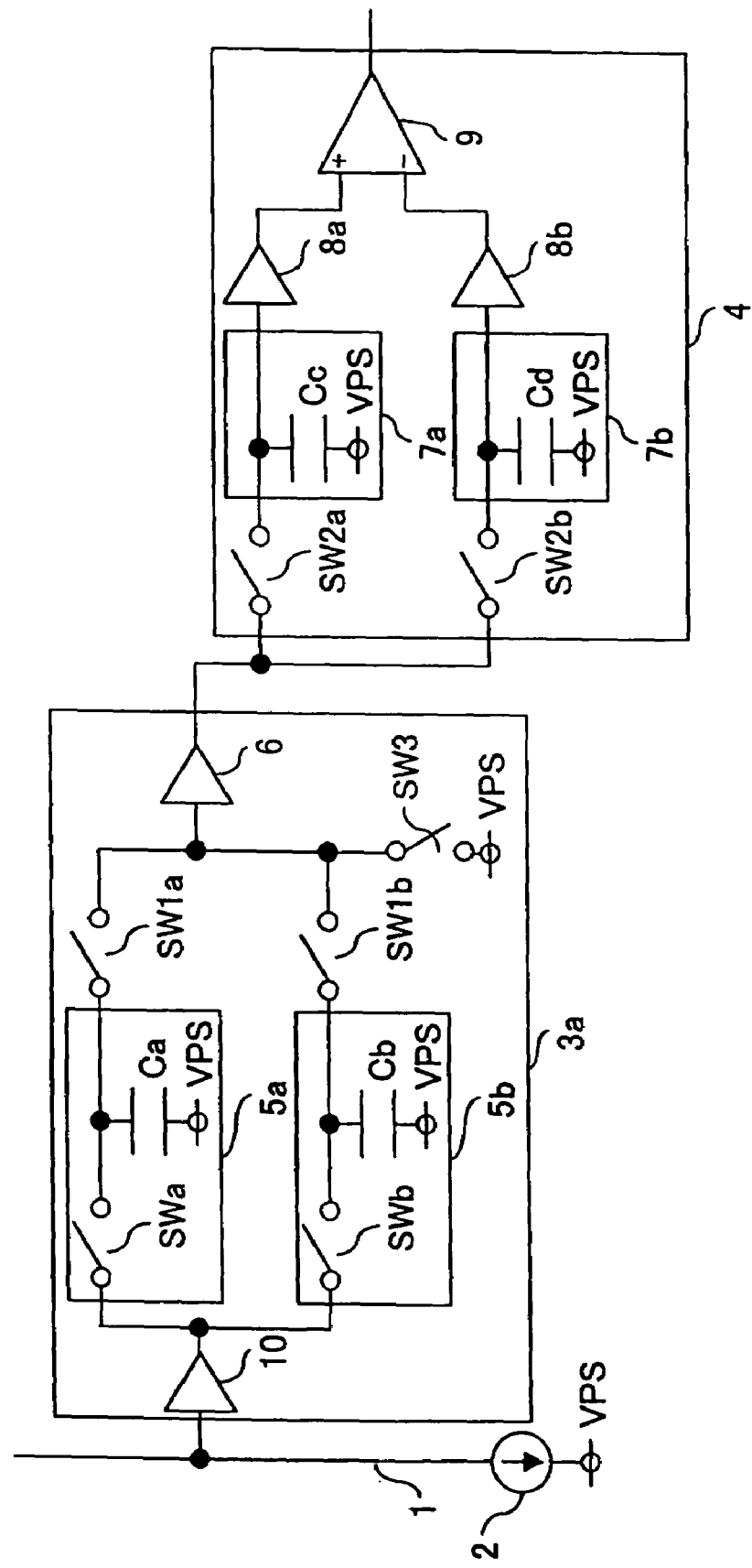
FIG. 7 is a block diagram showing another example of the internal configuration of the selector circuit and the correction circuit provided in the area sensor shown in FIG. 1.

The selector circuit may be, like the selector circuit 3a shown in FIG. 7 rather than the selector circuit 3 shown in FIG. 5, so configured as to have a buffer 10 having its input side connected to the signal line 1 and having its output side connected to the input sides of the holding circuits 5a and 5b. In FIG. 7, the correction circuit 4 has the same configuration as in FIG. 5. Also with the selector circuit 3a shown in FIG. 7, the MOS transistor T2 (see FIG. 2 or 3) provided in each pixel, the switches SW1a, SW1b, SW2a, SW2b, and SW3, and the holding circuits 5a, 5b, 7a, and 7b operate in the same manner as with the selector circuit 3 and the correction circuit 4 shown in FIG. 5, i.e. as shown in the timing chart of FIG. 6.

By providing the selector circuit with an additional buffer in the stage preceding the holding circuits for sampling and holding respectively an image signal and a noise signal, it is possible to permit the image and noise signals appearing on the signal line to be fed as clear signals with stable levels to the holding circuits.

In this embodiment, the pixels provided in the area sensor are each configured as shown in FIG. 2 when linearly proportional outputs are desired and as shown in FIG. 3 when logarithmically proportional outputs are desired. However, the configuration of the pixels is not limited to those shown in FIGS. 2 and 3, as long as they yield linearly or logarithmically proportional outputs as desired.

Second Embodiment

Figure 8:
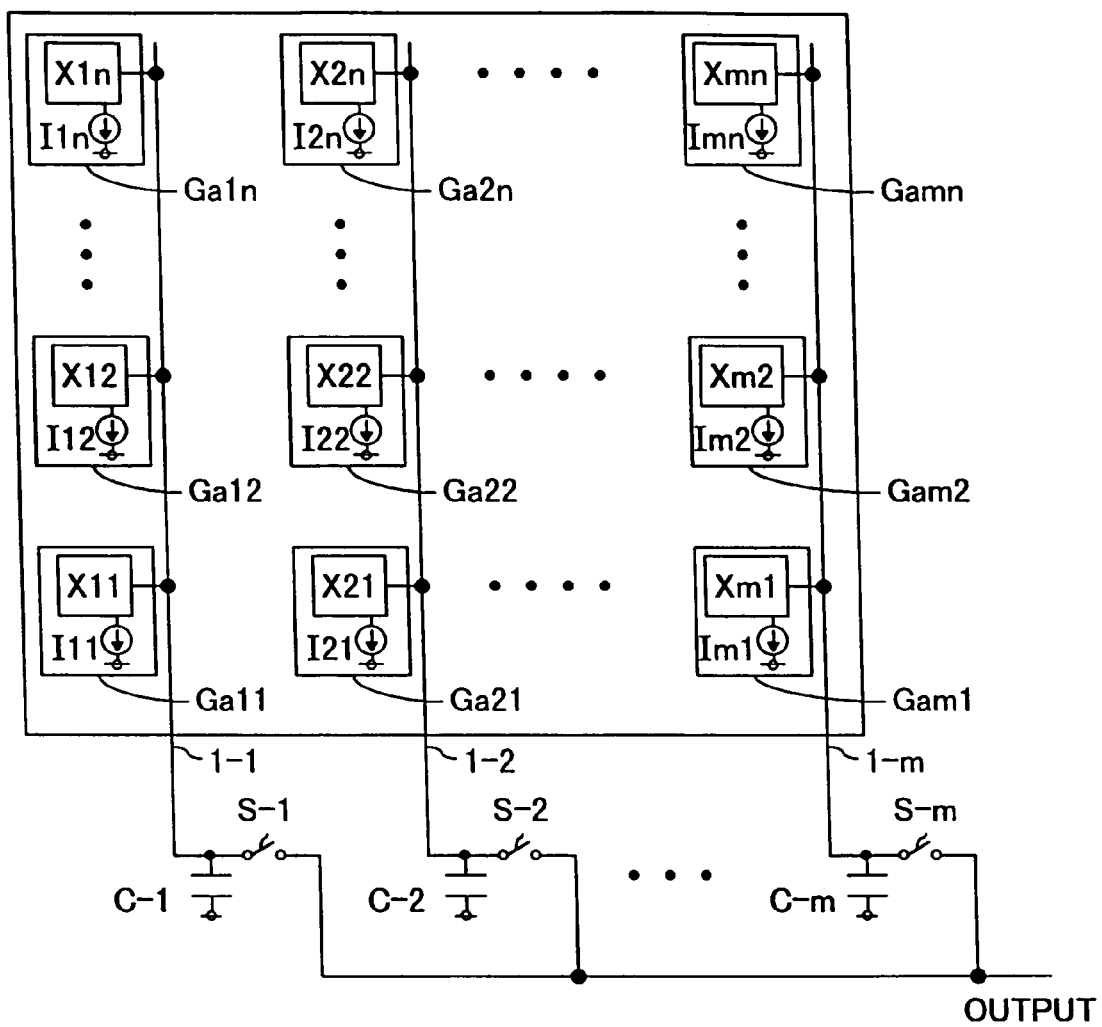
FIG. 8 is a block diagram showing the configuration of the area sensor of a second embodiment of the invention.

Next, the area sensor of a second embodiment of the present invention will be described with reference to the drawings. FIG. 8 is a block diagram showing the configuration of the area sensor of this embodiment. In the following descriptions, such elements as serve the same purposes as in the area sensor shown in FIG. 1 are identified with the same reference symbols, and their detailed descriptions will not be repeated.

1. Configuration of the Area Sensor

In the area sensor shown in FIG. 8, individual pixels Ga11 to Gamn each include a photoelectric converter X11 to Xmn and a constant-current source I11 to Imn. Moreover, signal lines 1-1 to 1-m are provided for each column, so that the outputs of the pixels Ga11 to Ga1n, Ga21 to Ga2n, . . . , Gam1 to Gamn arranged in individual columns are delivered to the signal lines 1-1, 1-2, . . . , 1-m, respectively. To these signal lines 1-1, 1-2, . . . , 1-m, capacitors C-1 to C-m are, at one end, connected individually. Furthermore, to the nodes between the signal lines 1-1 to 1-m and the capacitors C-1 to C-m, switches S-1 to S-m are connected individually.

In this area sensor, the output signals from the individual pixels Ga11 to Gamn are delivered, line by line, to the signal lines 1-1 to 1-m, and are then fed to the capacitors C-1 to C-m, respectively. By turning the switches S-1 to S-m one after another, the output signals thus sampled and held in the capacitors C1 to C-m are output sequentially so as to be fed out as serial data.

Specifically, first, the MOS transistor T22 or T24 (described later) provided in each of the pixels Ga1k to Gamk (where "k" represents a natural number fulfilling $1 \leq k \leq n$) is turned on, so that the output signals from those pixels are delivered to the signal lines 1-1 to 1-m and are then sampled and held in the capacitors C-1 to C-m. Here, the switches S-1 to S-m are off. Next, the switch S-1 is turned on, so that the output signal from the pixel Ga1k is fed out.

Next, the switch S-2 is turned on, so that the output signal from the pixel Ga2k is fed out. Similarly, by turning on the switches S-3 to S-m one after another, the output signals from the pixels Ga3k to Gamk are fed out sequentially. On completion of sequential output of the output signals from the pixels Ga1k to Gamk, then the output signals from the pixels G1(k+1) to Gm(k+1) are fed out in a similar manner. Now, the configuration of each pixel will be described.

2. First Example of Pixel Configuration

Figure 9:
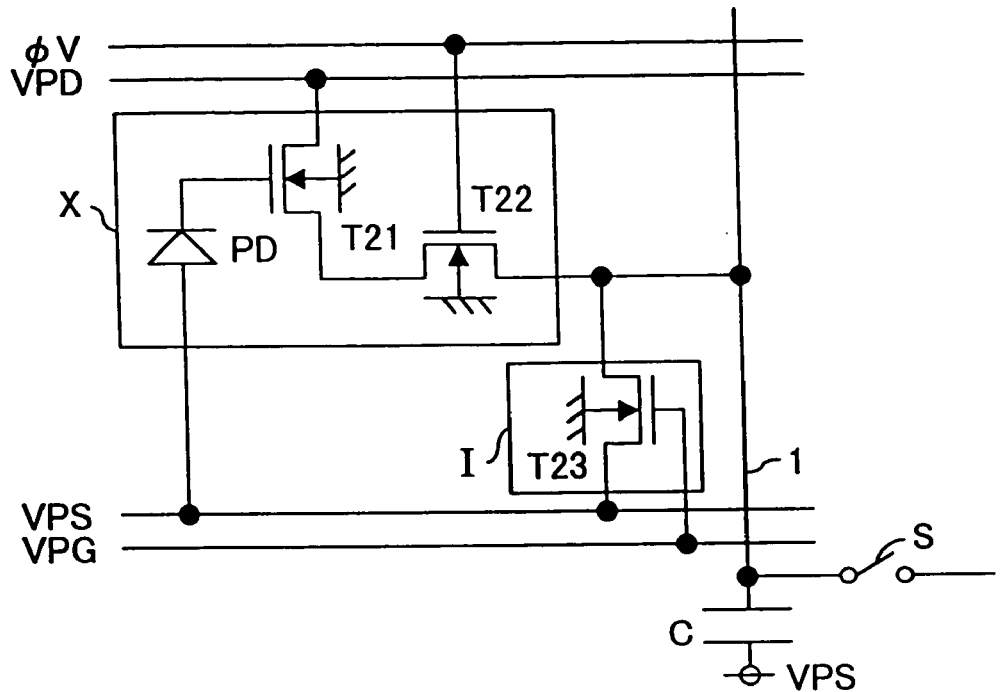
FIG. 9 is a circuit diagram showing an example of the internal configuration of each pixel provided in the area sensor shown in FIG. 8.

An example of the configuration of each of the pixels provided in the area sensor shown in FIG. 8 will be described below with reference to the drawings. FIG. 9 is a circuit diagram showing the pixel configuration of this example.

In the pixel shown in FIG. 9, a pn photodiode PD constitutes a photosensor. The cathode of this photodiode PD is connected to the gate of a MOS transistor T21, and the source of the MOS transistor T21 is connected to the drain of a MOS transistor T22. The source of the MOS transistor T22 is connected to the drain of a MOS transistor T23 and also to a signal line 1 (corresponding to the signal lines 1-1 to 1-m shown in FIG. 8). The MOS transistors T21 to T23 are all N-channel MOS transistors having their back gates grounded.

A direct-current voltage VPS is applied to the anode of the photodiode PD and also to the source of the MOS transistor T23. A direct-current voltage VPD is applied to the drain of the MOS transistor T21. A signal $\phi V$ is fed to the gate of the MOS transistor T22, and a direct-current voltage VPG is applied to the gate of the MOS transistor T23. In this pixel configured as described above, the photodiode PD and the MOS transistors T21 and T22 constitute a photoelectric converter X (corresponding to the photoelectric converters X11 to Xmn shown in FIG. 8), and the MOS transistor T23 constitutes a constant-current source I (corresponding to the constant-current sources I11 to Imn shown in FIG. 8). The capacitor C and the switch S shown in FIG. 9 correspond respectively to the capacitors C-1 to C-m and the switches S-1 to S-m shown in FIG. 8.

The area sensor having the pixels thereof configured as described above operates in the following manner. When light is incident on the photodiode PD, photoelectric charge appears therein according to the amount of incident light, and is fed to the gate of the MOS transistor T21. Here, the photoelectric charge fed to the gate of the MOS transistor T21 is negative, and therefore, the larger the amount of incident light, the larger the amount of negative electric charge, and thus the lower the gate voltage of the MOS transistor T21.

When a voltage linearly proportional to the amount of incident light appears at the gate of the MOS transistor T21 in this way, the pulse signal $\phi V$ is fed to the gate of the MOS transistor T22 to turn this MOS transistor T22 on. This causes the source of the MOS transistor T21 to be connected to the MOS transistor T23 functioning as a constant-current source, and thus the MOS transistor T21 operates as a source-follower circuit. This causes the output current output from the MOS transistor T21 to the signal line 1 to be voltage-amplified by the MOS transistor T23. As a result, a voltage signal (output signal) linearly proportional to the amount of incident light appears on the signal line 1, and is sampled and held in the capacitor C. When the output signal from the pixel is sampled and held in the capacitor C in this way, the switch S is turned on, so that the output signal is fed out.

3. Second Example of Pixel Configuration

Figure 10:
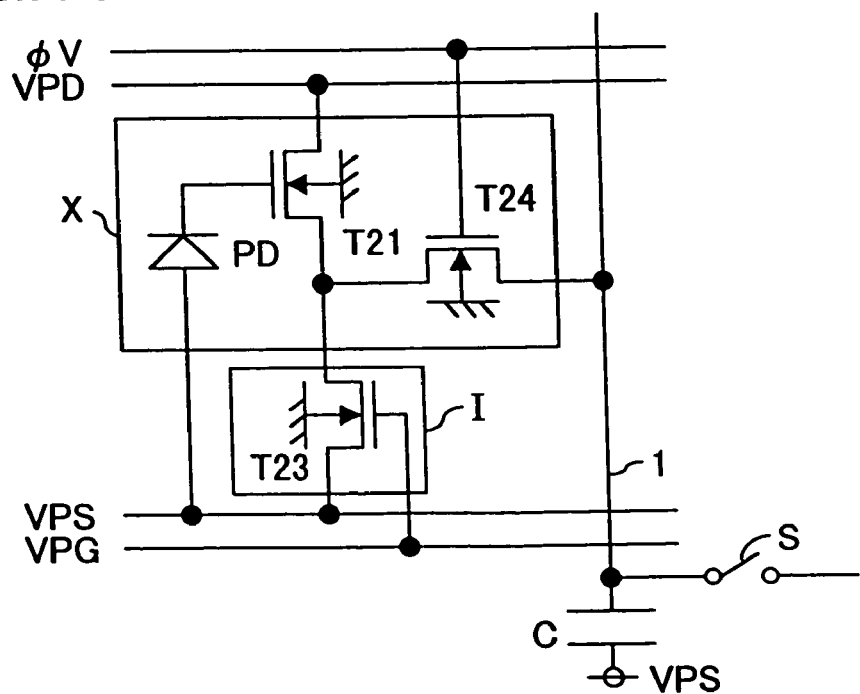
FIG. 10 is a circuit diagram showing another example of the internal configuration of each pixel provided in the area sensor shown in FIG. 8.

Another example of the configuration of each of the pixels provided in the area sensor shown in FIG. 8 will be described below with reference to the drawings. FIG. 10 is a circuit diagram showing the pixel configuration of this example. Here, such elements and signal lines as serve the same purposes as in the pixel shown in FIG. 9 are identified with the same reference symbols, and their detailed descriptions will not be repeated.

In the pixel shown in FIG. 10, as compared with the pixel shown in FIG. 9, the MOS transistor T22 is omitted, and instead a MOS transistor T24 is newly provided. Specifically, the source of the MOS transistor T21 is connected to the drains of the MOS transistors T23 and T24, and the source of the MOS transistor T24 is connected to the signal line 1. The signal $\phi V$ is fed to the gate of the MOS transistor T24. This MOS transistor T24 is, like the other MOS transistors T21 and T23, an N-channel MOS transistor having its back gate grounded.

In this pixel configured as described above, the photodiode PD and the MOS transistors T21 and T24 constitute a photoelectric converter X, and the MOS transistor T23 constitutes a constant-current source I. The newly provided MOS transistor T24, like the MOS transistor T22 shown in FIG. 9, functions as a switch that permits the output signal linearly proportional to the amount of incident light that is extracted from the source of the MOS transistor T21 to be fed to the signal line 1. The MOS transistors T21 and T23 and the photodiode PD shown in FIG. 10 operate in the same manner as the MOS transistors T21 and T23 and the photodiode PD shown in FIG. 9.

4. Third Example of Pixel Configuration

Figure 11:
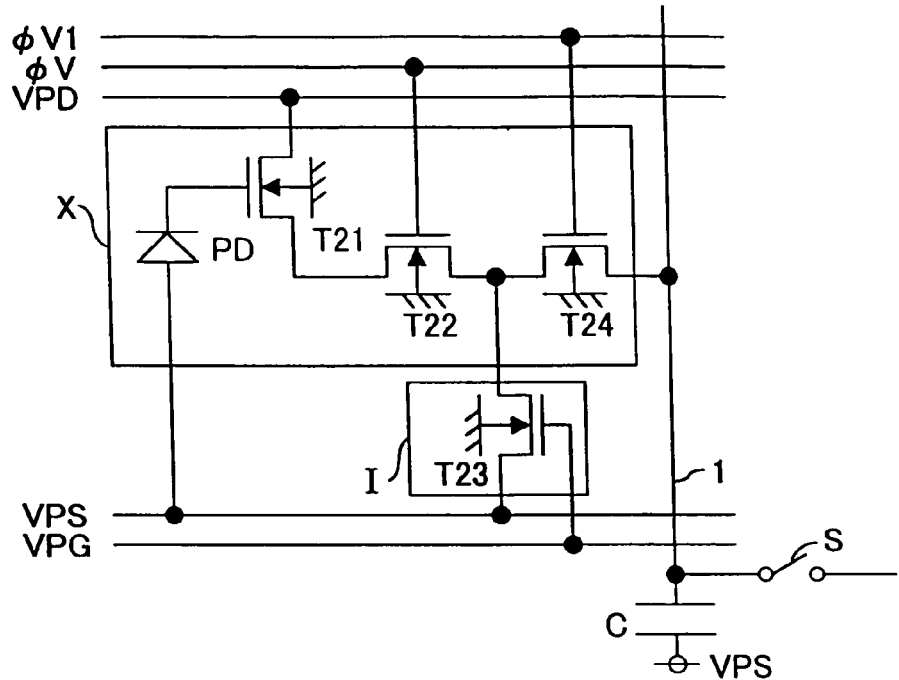
FIG. 11 is a circuit diagram showing another example of the internal configuration of each pixel provided in the area sensor shown in FIG. 8.

Another example of the configuration of each of the pixels provided in the area sensor shown in FIG. 8 will be described below with reference to the drawings. FIG. 11 is a circuit diagram showing the pixel configuration of this example. Here, such elements and signal lines as serve the same purposes as in the pixel shown in FIG. 9 are identified with the same reference symbols, and their detailed descriptions will not be repeated.

In the pixel shown in FIG. 11, as compared with the pixel shown in FIG. 9, a MOS transistor T24 is newly provided. Specifically, the source of the MOS transistor T22 is connected to the drains of the MOS transistors T23 and T24, and the source of the MOS transistor T24 is connected to the signal line 1. A signal $\phi V1$ is fed to the gate of the MOS transistor T24. This MOS transistor T24 is, like the other MOS transistors T21 to T23, an N-channel MOS transistor having its back gate grounded.

In this pixel configured as described above, the photodiode PD and the MOS transistors T21, T22, and T24 constitute a photoelectric converter X, and the MOS transistor T23 constitutes a constant-current source I. The pulse signals $\phi V$ and $\phi V1$ are fed in with the same timing, so that the newly provided MOS transistor T24 is turned on and off with the same timing as the MOS transistor T22. These MOS transistors T22 and T24 function as a switch that permits the output signal linearly proportional to the amount of incident light that is extracted from the source of the MOS transistor T21 to be fed to the signal line 1. The MOS transistors T21 to T23 and the photodiode PD shown in FIG. 11 operate in the same manner as the MOS transistors T21 to T23 and the photodiode PD shown in FIG. 9.

5. Fourth Example of Pixel Configuration

Figure 12:
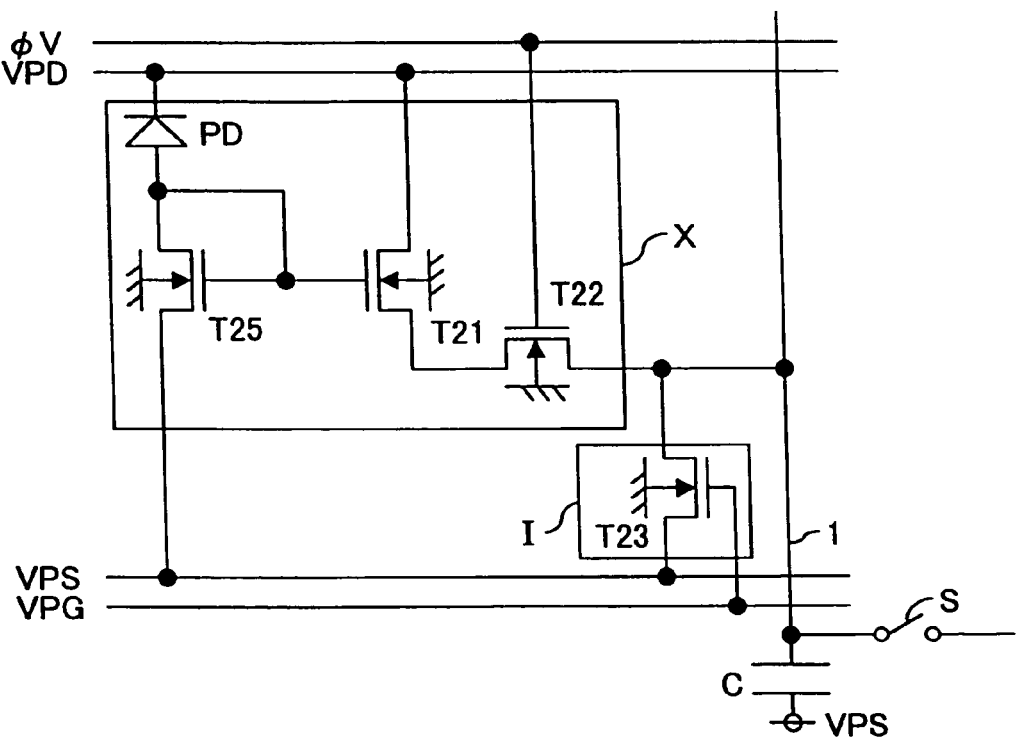
FIG. 12 is a circuit diagram showing another example of the internal configuration of each pixel provided in the area sensor shown in FIG. 8.

Another example of the configuration of each of the pixels provided in the area sensor shown in FIG. 8 will be described below with reference to the drawings. FIG. 12 is a circuit diagram showing the pixel configuration of this example.

In the pixel shown in FIG. 12, a pn photodiode PD constitutes a photosensor. The anode of this photodiode PD is connected to the drain and gate of a MOS transistor T25 and also to the gate of a MOS transistor T21. The source of the MOS transistor T21 is connected to the drain of a MOS transistor T22. The source of the MOS transistor T22 is connected to the drain of a MOS transistor T23 and also to a signal line 1 (corresponding to the signal lines 1-1 to 1-m shown in FIG. 8). The MOS transistors T21 to T23 and T25 are all N-channel MOS transistors having their back gates grounded.

A direct-current voltage VPD is applied to the cathode of the photodiode PD and to the drain of the MOS transistor T21. A direct-current voltage VPS is applied to the sources of the MOS transistors T23 and T25. A signal $\phi V$ is fed to the gate of the MOS transistor T22, and a direct-current voltage VPG is applied to the gate of the MOS transistor T23. The MOS transistors T21 and T25 are both so biased as to operate in a subthreshold region. In this pixel configured as described above, the photodiode PD and the MOS transistors T21, T22, and T25 constitute a photoelectric converter X (corresponding to the photoelectric converters X11 to Xmn shown in FIG. 8), and the MOS transistor T23 constitutes a constant-current source I (corresponding to the constant-current sources I11 to Imn shown in FIG. 8). The capacitor C and the switch S shown in FIG. 12 correspond respectively to the capacitors C-1 to C-m and the switches S-1 to S-m shown in FIG. 8.

When light is incident on the photodiode PD, a photocurrent appears therein, and, due to the subthreshold characteristics of MOS transistors, a voltage logarithmically proportional to the photocurrent appears at the gates of the MOS transistors T21 and T25. This voltage tends to cause a current logarithmically proportional to the photocurrent to flow through the MOS transistor T21 as its drain current.

Then, the pulse signal $\phi V$ is fed to the gate of the MOS transistor T22 to turn this MOS transistor T22 on. This causes the source of the MOS transistors T21 to be connected to the MOS transistor T23 functioning as a constant-current source, and thus the MOS transistor T21 operates as a source-follower circuit. This causes the output current output from the MOS transistor T21 to the signal line 1 to be voltage-amplified by the MOS transistor T23. As a result, a voltage signal (output signal) logarithmically proportional to the amount of incident light appears on the signal line 1, and is sampled and held in the capacitor C. When the output signal from the pixel is sampled and held in the capacitor C in this way, the switch S is turned on, so that the output signal is fed out.

In this example, another MOS transistor T24, like the one used in the second example, may be used instead of the MOS transistors T22 that functions as a switch that permits the output signal from the MOS transistor T21 to be delivered to the signal line 1. Alternatively, it is also possible, as in the third example, to provide both the MOS transistors T22 and T24 and turn them on and off simultaneously to deliver the output signal from the MOS transistor T21 to the signal line 1.

In this embodiment, the pixels provided in the area sensor are each configured as shown in FIGS. 9 to 11 when linearly proportional outputs are desired and as shown in FIG. 12 when logarithmically proportional outputs are desired. However, the configuration of the pixels is not limited to those shown in FIGS. 9 to 12, as long as they yield linearly or logarithmically proportional outputs as desired.

When constant-current sources are provided one for each pixel in this way, variations that arise in the outputs from individual pixels due to variations in the characteristics among individual constant-current sources become more diffused than when constant-current sources are provided one for each column. As a result, when the output signals from such an area sensor are reproduced, those variations appear randomly in the reproduced image, as opposed to fixed-pattern noise that appears as vertical stripes in an area sensor having constant-current sources provided one for each column. Since the human eye does not recognize such variations so clearly as it does fixed-pattern noise, the reproduced image appears free from variations.

Third Embodiment

Figure 13:
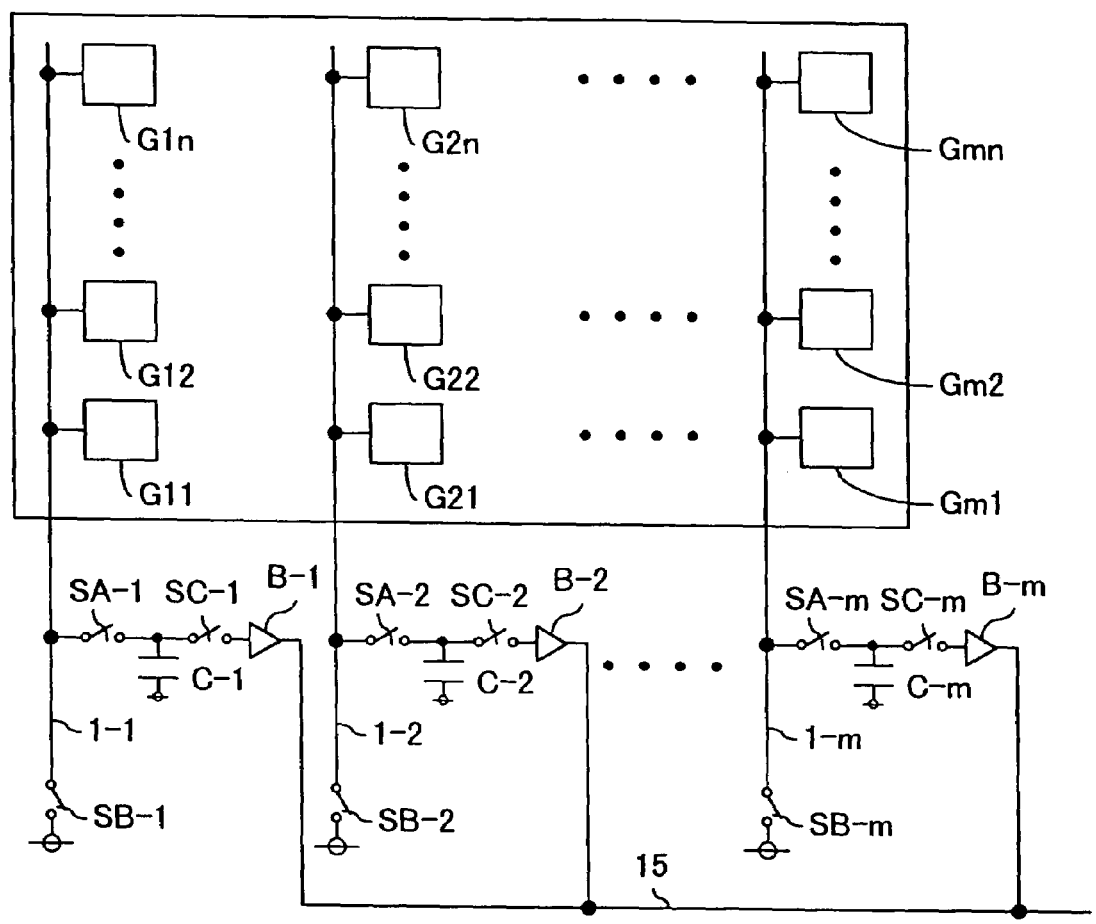
FIG. 13 is a block diagram showing the configuration of the area sensor of a third embodiment of the invention.

Next, the area sensor of a third embodiment of the present invention will be described with reference to the drawings. FIG. 13 is a block diagram showing the configuration of the area sensor of this embodiment. In the following descriptions, such elements as serve the same purposes as in the area sensor shown in FIG. 1 or 8 are identified with the same reference symbols, and their detailed descriptions will not be repeated.

1. Configuration of the Area Sensor

The area sensor shown in FIG. 13 has pixels G11 to Gmn, signal lines 1-1 to 1-m connected, one for each column of the pixels G11 to Gmn, to the output-side ends of the pixels G11 to Gmn, switches SA-1 to SA-m and switches SB-1 to SB-m each connected, at one end, to the corresponding one of the signal lines 1-1 to 1-m, capacitors C-1 to C-m and switches SC-1 to SC-m each connected, at one end, to the other end of the corresponding one of the switches SA-1 to SA-m, buffers B-1 to B-m each connected, at their input side, to the other end of the corresponding one of the switches SC-1 to SC-m, and an output signal line 15 servings as a final destination line connected to the output sides of the buffers Bi to B-m. The switches SB-1 to SB-m and the capacitors C-1 to C-m each receive, at the other end, a direct-current voltage VPSA.

The pixels G11 to Gmn provided in the area sensor is each provided with an output MOS transistor T3 (described later) that, when turned on, outputs the output signals from the pixels to the signal lines 1-1 to 1-m. This MOS transistor T3, when a pulse signal φV (described later) is fed to its gate, is turned on, and thereby permits the output signals from the pixels to be output, as current signals, to the signal lines 1-1 to 1-m.

Figure 14:
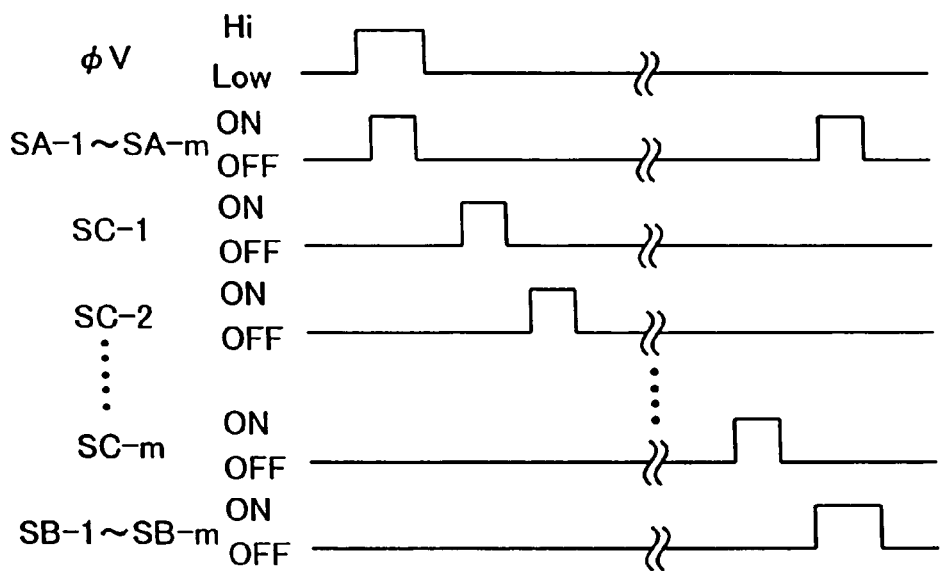
FIG. 14 is a timing chart showing the operation of the area sensor shown in FIG. 13.

Now, how this area sensor configured as described above operates will be described. FIG. 14 is a timing chart showing the operation of the relevant circuit components of the area sensor. For example, when the switches SA-1 to SA-m are turned on while the MOS transistor T3 provided in each of the pixels G1$k$ to Gmk (where "k" represents a natural number fulfilling $1 \leq k \leq n$) is on, the output signals from the pixels G1$k$ to Gmk are, as current signals, fed by way of the signal lines 1-1 to 1-m to the capacitors C-1 to C-m. When the output signals are fed, as current signals, to the capacitors C-1 to C-m in this way, these capacitors C-1 to C-m are charged with the current that flows into them. Thus, the voltages at the nodes between the switches SA-1 to SA-m and the capacitors C-1 to C-m are determined according to the amount of current that flows into the capacitors C-1 to C-m, respectively, and those voltages are sampled and held when the switches SA-1 to SA-m are turned off.

When the voltages proportional to the output signals from the pixels G1$k$ to Gmk are sampled and held in the capacitors C-1 to C-m, respectively, in this way, the switches SC-1, SC-2, . . . , SC-m are turned on one after another, so that the voltage signals sampled and held in the capacitors C-1, C-2, . . . , C-m are fed out through the buffers B-1, B-2, . . . , B-m, respectively, and then by way of the output signal line 15. In this way, the voltage signals proportional to the output signals from the pixels G1$k$, G2$k$, . . . , Gmk are fed out serially through the buffers B-1, B2, . . . , B-m. Subsequently, the switches SA-1 to SA-m and the switches SB-1 to SB-m are turned on, so that the voltages sampled and held in the capacitors C-1 to C-m are reset, and then the switches SA-1 to SA-m and the switches SB-1 to SB-m are turned off.

Then, the switches SA-1 to SA-m are turned on, so that the output signals from the pixels G1(k+1) to Gm(k+1) are fed to the capacitors C-1 to C-m, respectively. Thus, voltage signals proportional to the output signals from the pixels G1(k+1) to Gm(k+1) are sampled and held in the capacitors C-1 to C-m, respectively. When the voltage signals are sampled and held in the capacitors C-1 to C-m, respectively, the switches SC-1 to SC-m are turned on one after another just as described above, so that the voltage signals proportional to the output signals from the pixels G1(k+1) to Gm(k+1) are fed out serially by way of the signal output line 15. The operation described above is repeated, so that the voltage signals proportional to the output signals from the pixels G11 to Gmn are fed out serially by way of the output signal line 15.

2. First Example of Pixel Configuration

An example of the configuration of each of the pixels G11 to Gmn provided in the area sensor shown in FIG. 13 will be described below with reference to FIG. 15. In the pixel shown in FIG. 15, as compared with the pixel shown in FIG. 3, the MOS transistor T4 is omitted. Specifically, the anode of the photodiode PD is connected to the drain and gate of the MOS transistor T5 and also to the gate of the MOS transistor T1.

In this pixel configured as described above, the source of the MOS transistor T2 is connected by way of a signal line 1 to one end of the switch SA (corresponding to the switches SA-1 to SA-m shown in FIG. 13) and also to one end of the switch SB (corresponding to the switches SB-1 to SB-m shown in FIG. 13). The switch SB receives at the other end a direct-current voltage VPSA. The other end of the switch SA is connected to one end of a capacitor C (corresponding to the capacitors C-1 to C-m shown in FIG. 13) and also to one end of the switch (corresponding to the switches SC-1 to SC-m shown in FIG. 13). The capacitor C receives at the other end the direct-current voltage VPSA. The other end of the switch SC is connected to the input side of a buffer B (corresponding to the buffers B-1 to B-m shown in FIG. 13).

In this pixel configured as described above, when light is incident on the photodiode PD, a photocurrent appears therein, and, due to the subthreshold characteristics of a MOS transistor, a voltage logarithmically proportional to the photocurrent appears at the gates of the MOS transistors T5 and T1. When the pulse signal φV is fed to the MOS transistor T2, the MOS transistor T1 outputs, as an output current, its source current, which is proportional to its gate voltage, through the MOS transistor T2 to the signal line 1. The output signal output through the MOS transistor T2 is proportional to the gate voltage of the MOS transistor T1, and is therefore natural-logarithmically proportional to the amount of light incident on the photodiode PD.

In this state, when the switches SA, SB, and SC are turned on, off and off, respectively, the output signal flows, as a current signal, through the MOS transistor T2 into the capacitor C, and thereby the capacitor C is charged. As a result, the voltage at the node between the capacitor C and the switch SA is proportional to the output signal fed thereto through the MOS transistor T2, and thus this voltage is sampled and held in the capacitor C.

When the voltage is sampled and held in the capacitor C in this way, the switch SA is turned off and the signal φV is turned to a low level. Then, the switch SC is turned on, so that the voltage sampled and held there is, as a voltage signal, fed out through the buffer B. Then, the switch SC is turned off, and then the switches SA and SB are turned on, so that the voltage at the node between the capacitor C and the switch SA is reset. This initializes the state of capacitor C and makes it ready to be charged with the output signal that is output next time.

3. Second Example of Pixel Configuration

Another example of the configuration of each of the pixels G11 to Gmn provided in the area sensor shown in FIG. 13 will be described below with reference to FIG. 16. In the pixel shown in FIG. 16, as compared with the pixel shown in FIG. 2, the MOS transistor T3 is omitted. This pixel configured as described above is connected, by way of a signal line 1, to switches SA, SB, and SC, a capacitor C, and a buffer B that are interconnected in the same manner as in the pixel shown in FIG. 15.

In this pixel configured as described above, when light is incident on the photodiode PD, a photocurrent appears therein, and electric charge is accumulated at the gate of the MOS transistor T1. Thus, as the photocurrent flows out of the photodiode PD, the gate voltage of the MOS transistor T1 becomes lower. When the pulse signal φV is fed to the MOS transistor T2, the MOS transistor T1 outputs, as an output current, its source current, which is proportional to its gate voltage, through the MOS transistor T2 to the signal line 1.

The output signal output through the MOS transistor T2 is proportional to the amount of electric charge accumulated at the gate of the MOS transistor T1, and therefore the output signal is linearly proportional to the amount of light incident on the photodiode PD. The output current thus output is then, by the switches SA, SB, and SC and the MOS transistor T2 operating with the same timing as in the pixel shown in FIG. 15, sampled and held, as a voltage signal, in the capacitor C and then fed out through the buffer B.

Fourth Embodiment

Figure 17:
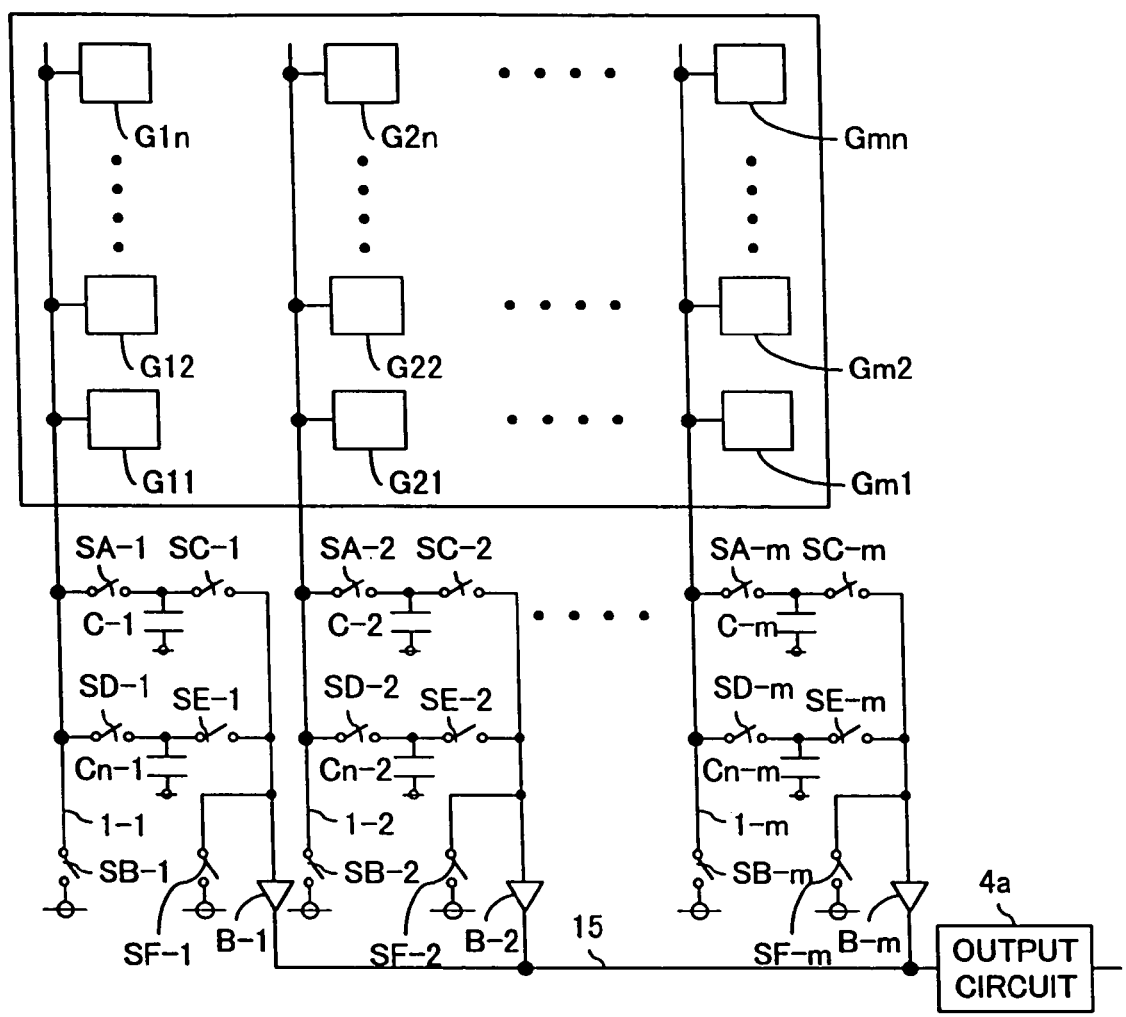
FIG. 17 is a block diagram showing the configuration of the area sensor of a fourth embodiment of the invention.

Next, the area sensor of a fourth embodiment of the present invention will be described with reference to the drawings. FIG. 17 is a block diagram showing the configuration of the area sensor of this embodiment. In the following descriptions, such elements as serve the same purposes as in the area sensor shown in FIG. 13 are identified with the same reference symbols, and their detailed descriptions will not be repeated.

1. Configuration of the Area Sensor

The area sensor shown in FIG. 17 has pixels G11 to Gmn, signal lines 1-1 to 1-m, switches SA-1 to SA-m, capacitors C-1 to C-m, switches SB-1 to SB-m, switches SC-1 to SC-m, buffers B-1 to B-m, an output signal line 15, switches SD-1 and SD-m each connected, at one end, to the corresponding one of the signal lines 1-1 to 1-m, capacitors Cn-1 to Cn-m and switches SE-1 to SE-m each connected, at one end, to the other end of the corresponding one of the switches SD-1 to SD-m, switches SF-1 to SF-m each connected, at one end, to the input side of the corresponding one of the buffers B-1 to B-m, and an output circuit 4a connected to the output signal line 15. The switches SE-1 to SE-m are each connected, at the other end, to the input side of the corresponding one of the buffers B-1 to B-m. The switches SF-1 to SF-m and the capacitors Cn-1 to Cn-m each receive, at the other end, a direct current voltage VPSA.

The pixels G11 to Gmn provided in the area sensor are, as in the first embodiment, each provided with an output MOS transistor T2 that, when turned on, outputs the output signals from the pixels to the signal lines 1-1 to 1-m. This MOS transistor T2, when a pulse signal φV (described later) is fed to its gate, is turned on, and thereby permits the output signals from the pixels to be output, as current signals, to the signal lines 1-1 to 1-m. Moreover, as will be described later, the pixels G11 to Gmn output image signals when an image sensing operation is performed, and output noise signals when an operation for detecting variations in sensitivity among the pixels or a resetting operation is performed.

Figure 18:
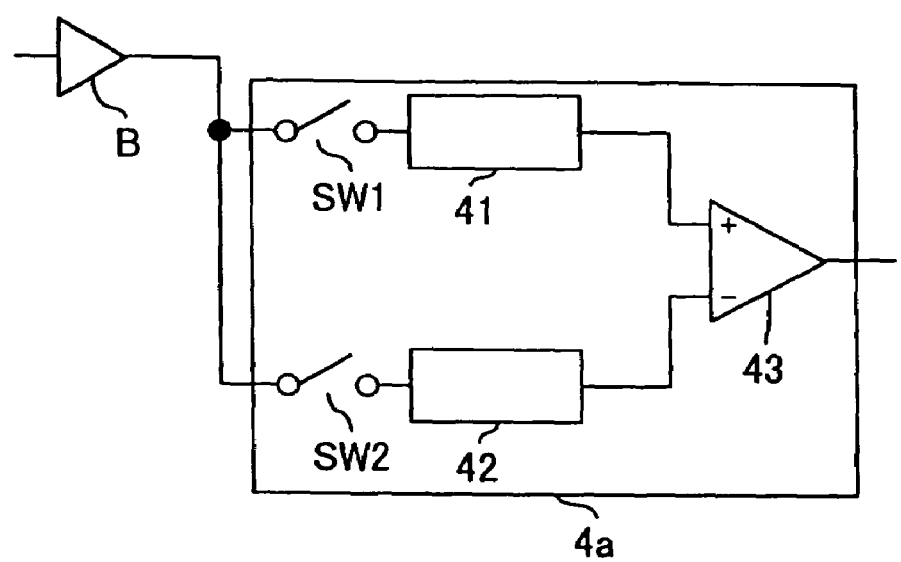
FIG. 18 is a block diagram showing the configuration of the output circuit provided in the area sensor shown in FIG. 17.

As shown in FIG. 18, the output circuit 4a provided in this area sensor is composed of switches SW1 and SW2 each connected, at one end, to the output side of the buffer B (corresponding to the buffers B-1 to B-m shown in FIG. 17), holding circuits 41 and 42 connected, at their input side, to the other end of those switches SW1 and SW2, respectively, and a differential amplifier 43 of which the non-inverting input terminal is connected to the output side of the holding circuit 41 and of which the inverting input terminal is connected to the output side of the holding circuit 42.

Figure 19:
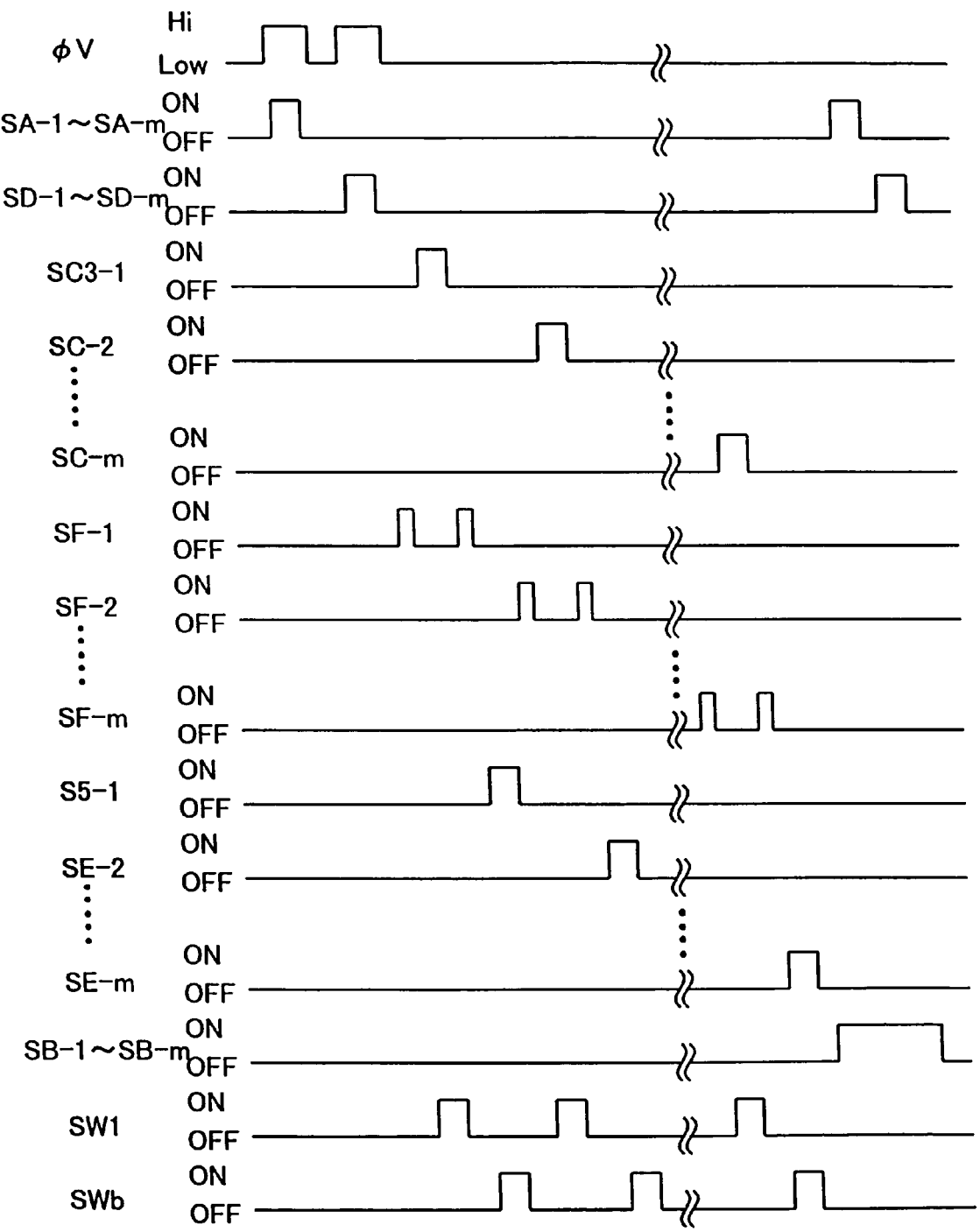
FIG. 19 is a timing chart showing the operation of the area sensor shown in FIG. 17.

Now, how this area sensor configured as described above operates will be described. FIG. 19 is a timing chart showing the operation of the relevant circuit components of the area sensor. For example, suppose first that the pixels G1k to Gmk (where "k" represents a natural number fulfilling 1≦k≦n) are performing an image sensing operation. When the switches SA-1 to SA-m are turned on while the MOS transistor T2 provided in each of the pixels G1k to Gmk is on, the image signals from those pixels are, as current signals, fed by way of the output signal lines 1-1 to 1-m to the capacitors C-1 to C-m. When the image signals are fed to the capacitors C-1 to C-m in this way, the capacitors C-1 to C-m are charged individually by the current that flows into them. Thus, the voltages at the nodes between the switches SA-1 to SA-m and the capacitors C-1 to C-m are determined according to the amount of current that flows into the capacitors C-1 to C-m, respectively, and those voltages are sampled and held when the switches SA-1 to SA-m are turned off.

Next, the pixels G1k to Gmk performs a resetting operation or a sensitivity variation detection operation. When the switches SD-1 to SD-m are turned on while the MOS transistor T2 provided in each of the pixels G1k to Gmk is on, the noise signals from those pixels are, as current signals, fed by way of the output signal lines 1-1 to 1-m to the capacitors Cn-1 to Cn-m. When the noise signals are fed to the capacitors Cn-1 to Cn-m in this way, the capacitors Cn-1 to Cn-m are charged individually by the current that flows into them. Thus, the voltages at the nodes between the switches SD-1 to SD-m and the capacitors Cn-1 to Cn-m are determined according to the amount of current that flows into the capacitors Cn-1 to Cn-m, respectively, and those voltages are sampled and held when the switches SD-1 to SD-m are turned off.

When the image signals and the noise signals are sampled and held in the capacitors C1-1 to C1-m and in the capacitors Cn-1 to Cn-m, respectively, in this way, first, the switch SF-1 is turned on, so that the input side of the buffer B-1 is reset, and then the switch SF-1 is turned off. Subsequently, the switch SC-1 and the switch SW1 provided in the output circuit 4a are turned on, so that a voltage signal proportional to the image signal from the pixel Gk1 is fed through the buffer B-1 to the holding circuit 41. Then, the switches SC-1 and SW1 are turned off, and then the switch SF-1 is turned on, so that the input side of the buffer B-1 is reset. Then, the switches SE-1 and SW2 are turned on, so that a voltage signal proportional to the noise signal from the pixel G1k is fed through the buffer B-1 to the holding circuit 42. Then, the switches SE-1 and SW2 are turned off. When the voltage signals proportional to the image and noise signals from the pixel G1k are fed to the holding circuits 41 and 42 in this way, the differential amplifier 43 outputs the image signal from the pixel G1k after correcting it for the noise component contained therein.

Next, the switch SF-2 is turned on, so that the input side of the buffer B-2 is reset, and then the switch SF-2 is turned off. Then, the switches SC-2 and SW1 are turned on, so that a voltage signal proportional to the image signal from the pixel G2k is fed to the holding circuit 41. Then, the switches SC-2 and SW1 are turned off, and then the switch SF-2 is turned on, so that the input side of the buffer B-2 is reset.

Then, the switches SE-2 and SW2 are turned on, so that a voltage signal proportional to the noise signal from the pixel G2k is fed to the holding circuit 42. When the voltage signals proportional to the image and noise signals from the pixel G2k are fed to the holding circuits 41 and 42 in this way, the differential amplifier 43 outputs the image signal from the pixel G2k after correcting it for the noise component contained therein.

Thereafter, the switches SC-3 to SC-m, SE-3 to SE-m, and SF-3 to SF-m, and the buffers B-3 to B-m operate successively together with the output circuit 4a in the same manner as described above, so that the output circuit 4a serially outputs the sensitivity-variation-corrected image signals from the pixels G3k, G4k, ..., Gmk. When, in this way, the output circuit 4a completes serial output of the image signals from the pixels G1k to Gmk arranged in a line, first, the switches SA-1 to SA-m and the switches SB-1 to SB-m are turned on, so that the voltages sampled and held in the capacitors C-1 to C-m are reset, and then the switches SA-1 to SA-m are turned off. Then, the switches SD-1 to SD-m and the switches SB-1 to SB-m are turned on, so that the voltages sampled and held in the capacitors Cn-1 to Cn-m are reset, and then the switches SD-1 to SD-m and the switches SB-1 to SB-m are turned off.

Subsequently, the switches SA-1 to SA-m are turned on, so that the image signals from the pixels G1(k+1) to Gm(k+1) are fed to the capacitors C-1 to C-m. This causes voltage signals proportional to the image signals from the pixels G1(k+1) to Gm(k+1) to be sampled and held in the capacitors C-1 to C-m. Then, the switches SD-1 to SD-m are turned on, so that the noise signals from the pixels G1(k+1) to Gm(k+1) are fed to the capacitors Cn-1 to Cn-m. This causes voltage signals proportional to the noise signals from the pixels G1(k+1) to Gm(k+1) to be sampled and held in the capacitors Cn-1 to Cn-m.

When the voltage signals are sampled and held in the capacitors C-1 to C-m and Cn-1 to Cn-m in this way, the switches SC-1 to SC-m, SE-1 to SE-m, and SF-1 to SF-m, and the buffers B-1 to B-m operate successively together with the output circuit 4a in the same manner as described above, so that the output circuit 4a serially outputs the sensitivity-variation-corrected image signals from the pixels G1(k+1) to Gm(k+1). When the output circuit 4a completes outputting the image signals from the pixels G1(k+1) to Gm(k+1), the switches SA-1 to SA-m, SB-1 to SB-m, and SD-1 to SD-m successively operate in the same manner as described above to initialize the capacitors C-1 to C-m and Cn-1 to Cn-m. The operation described above is repeated, so that the output circuit 4a serially outputs voltage signals proportional to the sensitivity-variation-corrected image signals from the pixels G11 to Gmn.

2. First Example of Pixel Configuration

An example of the configuration of each of the pixels G11 to Gmn provided in the area sensor shown in FIG. 17 will be described below with reference to FIG. 20. The pixel shown in FIG. 20 has the same configuration as the pixel shown in FIG. 3.

Figure 15:
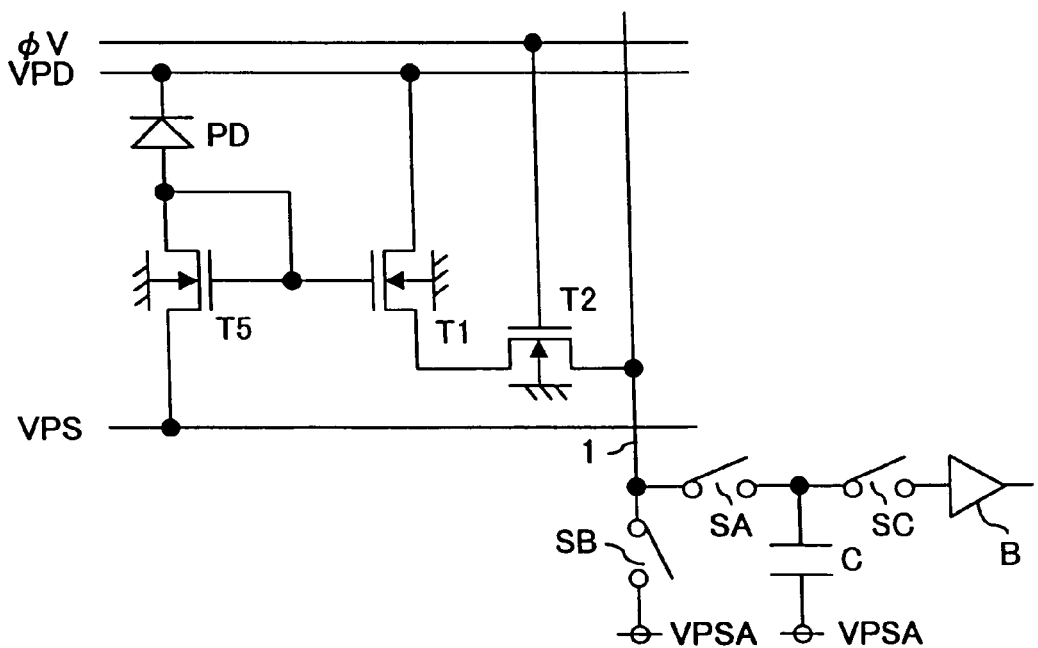
FIG. 15 is a circuit diagram showing an example of the configuration of each pixel provided in the area sensor shown in FIG. 13.
Figure 16:
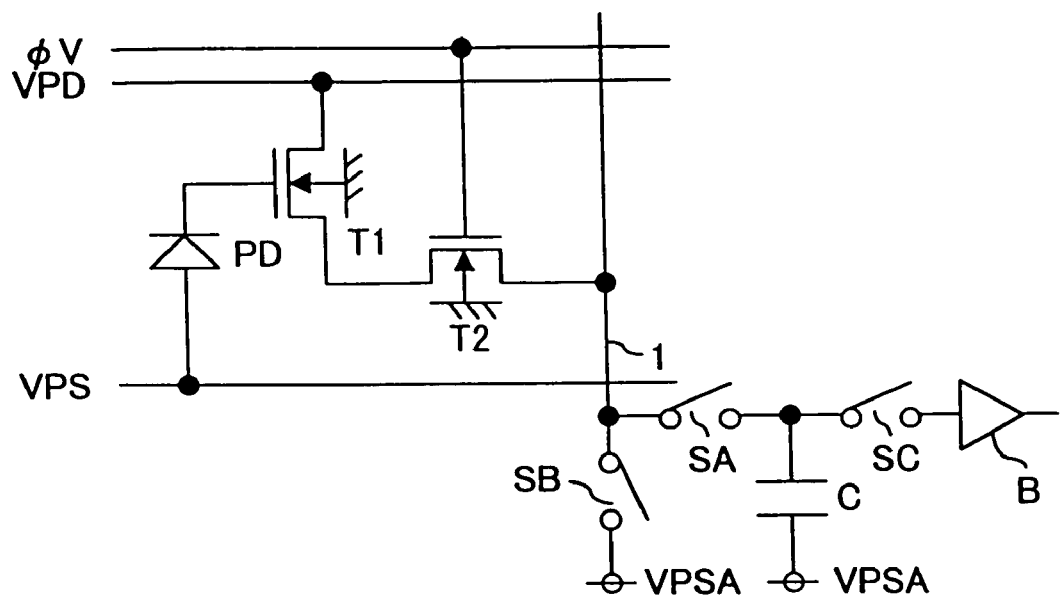
FIG. 16 is a circuit diagram showing another example of the configuration of each pixel provided in the area sensor shown in FIG. 13.

This pixel configured as described above is connected, by way of a signal line 1 (corresponding to the signal lines 1-1 to 1-m shown in FIG. 17), to switches SA, SB, and SC (corresponding to the switches SA-1 to SA-m, SB-1 to SB-m, and SC-1 to SC-m, respectively, shown in FIG. 17), a capacitor C (corresponding to the capacitors C-1 to C-m shown in FIG. 17), and a buffer B (corresponding to the buffers B-1 to B-m shown in FIG. 17) that are interconnected in the same manner as in the pixel shown in FIG. 15.

Furthermore, to the node between the switches SA and SB, one end of a switch SD (corresponding to the switches SD-1 to SD-m shown in FIG. 17) is connected. The other end of this switch SD is connected to one end of a capacitor Cn (corresponding to the capacitors Cn-1 to Cn-m shown in FIG. 17). To the other end of this capacitor Cn, a direct-current voltage VPSA is applied. To the node between the switch SD and the capacitor Cn, one end of a switch SE (corresponding to the switches SE-1 to SE-m shown in FIG. 17) is connected. The other end of this switch SE is connected to the input side of the buffer B. To the input side of the buffer B, one end of a switch SF (corresponding to the switches SF-1 to SF-m shown in FIG. 17) is also connected. To the other end of this switch SF, the direct-current voltage VPSA is applied.

How this pixel configured as described above operates in an image sensing operation and in a sensitivity variation detection operation will be described below. Here, the signal $\phi VPS$ is a binary voltage signal that is either at a high level that causes the MOS transistor T5 to operate in a subthreshold region or at a low level that is lower than this high level and causes a higher current to flow through the MOS transistor T5 than when it is fed with a high level as the signal $\phi VPS$.

(1) Image Sensing Operation (When Image Signals are Output)

Figure 20:
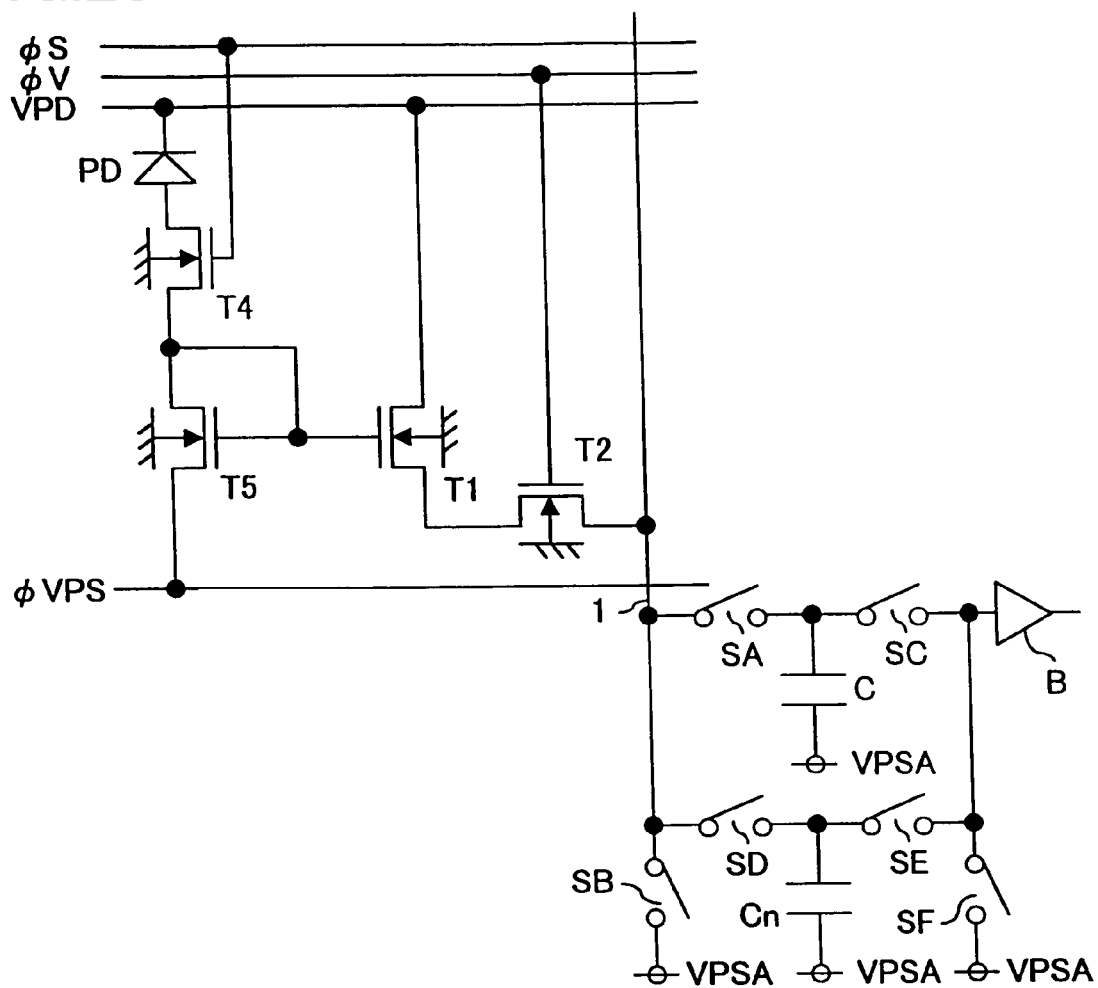
FIG. 20 is a circuit diagram showing an example of the configuration of each pixel provided in the area sensor shown in FIG. 17.

First, how the pixel configured as shown in FIG. 20 operates in an image sensing operation will be described. As described earlier in connection with the first embodiment, during an image sensing operation, the signal $\phi S$ is kept at a high level to keep the MOS transistor T4 on, and in addition the signal $\phi VPS$ fed to the source of the MOS transistor T5 is kept at a high level to output a current signal (image signal) natural-logarithmically proportional to the photocurrent.

In this state, when the switch SA is turned on and all the other switches SB to SF are turned off, the output signal from the pixel flows, as a current signal, through the MOS transistor T2 into the capacitor C, and thereby the capacitor C is charged. Thus, a voltage proportional to the image signal is sampled and held in the capacitor C. When the voltage is sampled and held in the capacitor C in this way, the switch SA is turned off, and the signal $\phi V$ is turned to a low level.

(2) Sensitivity Variation Detection Operation (When Noise Signals are Output)

Next, how the same pixel operates in an operation for detecting variations in sensitivity among individual pixels will be described. In a sensitivity variation detection operation, as described earlier in connection with the first embodiment, the pulse signals $\phi V$, $\phi S$, and $\phi VPS$ are fed in with the timing shown in the timing chart of FIG. 4, so that a current signal (noise signal) representing the variation in sensitivity of this particular pixel due to variations in the characteristics of the MOS transistors T1 and T5 is output to the signal line 1.

In this state, when the switch SD is turned on and all the other switches SA to SC, SE, and SF are turned off, the output signal from the pixel flows, as a current signal, through the MOS transistor T2 into the capacitor Cn, and thereby the capacitor Cn is charged. Thus, a voltage proportional to the noise signal is sampled and held in the capacitor Cn. When the voltage is sampled and held in the capacitor Cn in this way, the switch SD is turned off, and the signal $\phi V$ is turned to a low level. Then, the signal $\phi S$ is turned to a high level to bring the MOS transistor T4 into a conducting state in preparation for an image sensing operation.

When the voltages proportional to the image and noise signals are sampled and held in the capacitors C and Cn, respectively, in this way, first, the switch SF is turned on, so that the input side of the buffer B is reset. Then, the switch SF is turned off, and then the switch SC is turned on. This causes the voltage proportional to the image signal, i.e. the voltage sampled and held in the capacitor C, to be fed out as a voltage signal through the buffer B. Then, the switch SC is turned off, and then the switch SF is turned on, so that the input side of the buffer B is reset. Then, the switch SF is turned off, and then the switch SE is turned on. This causes the voltage proportional to the noise signal, i.e. the voltage sampled and held in the capacitor Cn, to be fed out as a voltage signal through the buffer B.

Then, the switch SE is turned off, and then the switch SB is turned on and the switch SA is turned on to discharge and thereby initialize the capacitor C. Then, the switch SD is turned on to discharge and thereby initialize the capacitor Cn.

3. Second Example of Pixel Configuration

Another example of the configuration of each of the pixels G11 to Gmn provided in the area sensor shown in FIG. 17 will be described below with reference to FIG. 21. The pixel shown in FIG. 21 has the same configuration as the pixel shown in FIG. 2. In addition, the pixel shown in FIG. 21 is connected, by way of a signal line 1, to switches SA to SF, capacitors C and Cn, and a buffer B that are interconnected in the same manner as in the pixel shown in FIG. 20.

(1) Image Sensing Operation (When Image Signals are Output)

Figure 21:
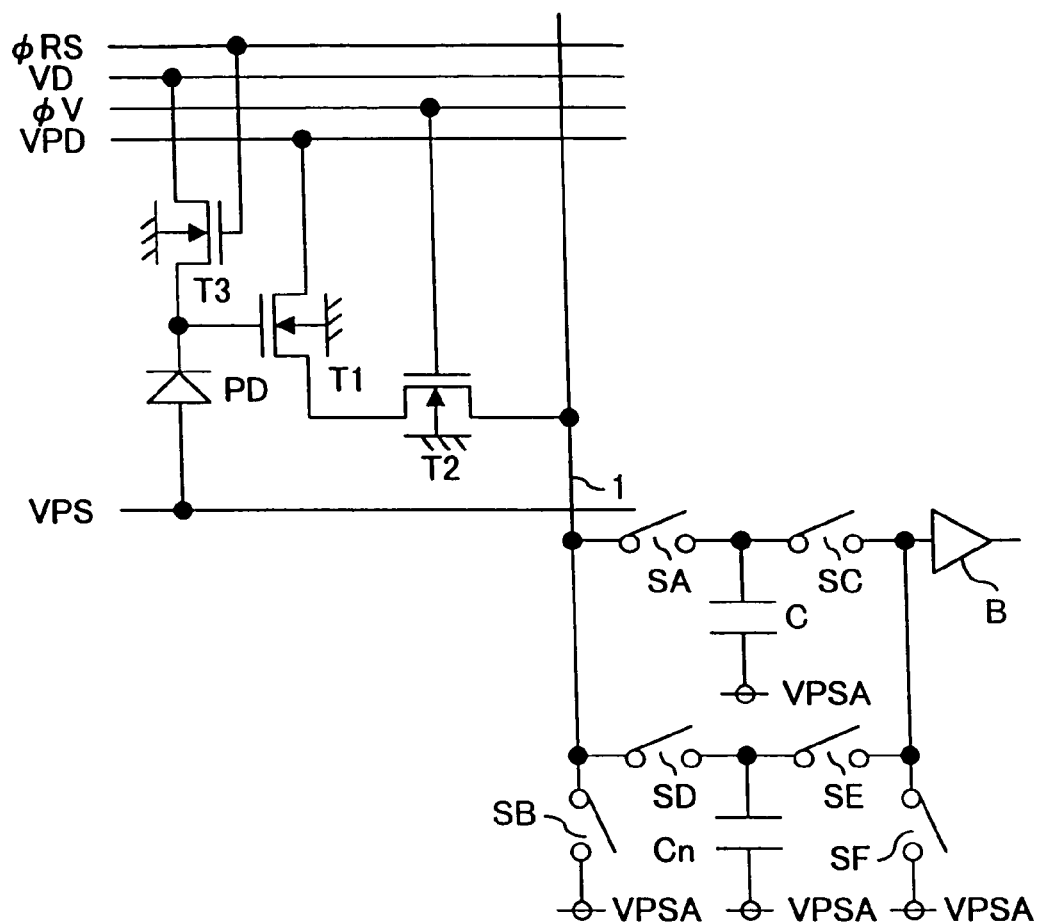
FIG. 21 is a circuit diagram showing another example of the configuration of each pixel provided in the area sensor shown in FIG. 17.

First, how the pixel configured as shown in FIG. 21 operates in an image sensing operation will be described. As described earlier in connection with the first embodiment, during an image sensing operation, the signal $\phi RS$ is kept at a low level to keep the MOS transistor T3 off and thereby output a current signal (image signal) linearly proportional to the photocurrent.

In this state, just as when the pixel shown in FIG. 20 outputs an image signal, when the switch SA is turned on and all the other switches SB to SF are turned off, the output signal from the pixel flows, as a current signal, through the MOS transistor T2 into the capacitor C, and thereby the capacitor C is charged. Thus, a voltage proportional to the image signal is sampled and held in the capacitor C. When the voltage is sampled and held in the capacitor C, the switch SA is turned off, and the signal $\phi V$ is turned to a low level.

(2) Resetting Operation (When Noise Signals are Output)

Next, how the same pixel operates in a resetting operation will be described. In a resetting operation, as described earlier in connection with the first embodiment, after the MOS transistor T2 is turned on and an image signal is output from the pixel to the signal line 1, the MOS transistor T2 is turned off, and then the signal $\phi RS$ is turned to a high level to turn the MOS transistor T3 on. This causes the gate voltage of the MOS transistor T1 of each pixel to be forcibly made uniformly equal to the voltage VD.

Thus, when the pulse signal $\phi V$ is fed to the gate of the MOS transistor T2 to turn this MOS transistor T2 on, a current signal (noise signal) representing the variation in the amplification factor of the MOS transistor T1, i.e. what causes the variation in sensitivity of this particular pixel, is output to the signal line 1.

In this state, just as when the pixel shown in FIG. 20 outputs a noise signal, when the switch SD is turned on and all the other switches SA to SC, SE, and SF are turned off, the output signal from the pixel flows, as a current signal, through the MOS transistor T2 into the capacitor Cn, and thereby the capacitor Cn is charged. Thus, a voltage proportional to the noise signal is sampled and held in the capacitor Cn. When the voltage is sampled and held in the capacitor Cn in this way, the signal $\phi V$ is turned to a low level, and the switch SD is turned off. Then, the signal $\phi RS$ is turned to a low level to turn the MOS transistor T3 off in preparation for the next image sensing operation.

When the voltages proportional to the image and noise signals are sampled and held in the capacitors C and Cn, respectively, in this way, first, the switch SF is turned on, so that the input side of the buffer B is reset. Then, the switch SF is turned off, and then the switch SC is turned on. This causes the voltage proportional to the image signal, i.e. the voltage sampled and held in the capacitor C, to be fed out as a voltage signal through the buffer B. Then, the switch SC is turned off, and then the switch SF is turned on, so that the input side of the buffer B is reset. Then, the switch SF is turned off, and then the switch SE is turned on. This causes the voltage proportional to the noise signal, i.e. the voltage sampled and held in the capacitor Cn, to be fed out as a voltage signal through the buffer B.

Then, the switch SE is turned off, and then the switch SB is turned on and the switch SA is turned on to discharge and thereby initialize the capacitor C. Then, the switch SD is turned on to discharge and thereby initialize the capacitor Cn.

As described above, in the area sensors of the third and fourth embodiments, the output current from each pixel is converted into a voltage signal by being integrated by an integrator circuit having a capacitor. The voltage signal thus obtained is sampled and held in this integrator circuit. This eliminates the need for a source-follower circuit based circuit configuration requiring a constant-current source and a resistor as conventionally used, and in addition helps reduce fixed-pattern noise that results from variations in the characteristics of the constant-current source and the resistor from one column to another.

The area sensors (solid-state image-sensing devices) of the third and fourth embodiments do not necessarily have to be configured exactly as shown in FIGS. 13 and 17, but may be configured in any other manner as long as the individual pixels yield output currents as their output signals and those output currents are sampled and held. The pixels provided in these area sensors so as to output image signals and noise signals do not necessarily have to be configured exactly as shown in FIG. 15, 16, 20, or 21, but may be configured in any other manner as long as they yield output currents as their output signals. Moreover, although the area sensors of the third and fourth embodiments operate in such a way that the outputs from the individual pixels are output sequentially in order of arrangement of columns and lines, it is also possible to output those outputs starting with any pixel randomly selected in the vertical and horizontal directions.

According to the present invention, when image signals and noise signals are fed from their respective selector circuits to a correction circuit, the image signals and noise signals are both fed by way of a single signal path. Thus, even if there are variations in the characteristics of the selector circuits from one column to another, those variations are canceled by subtracting the noise signals from the image signals in the correction circuit. This helps suppress fixed-pattern noise that appears as vertical stripes corresponding to the individual columns when the image signals are reproduced.

Moreover, according to the present invention, the pixels are each provided with a constant-current source that amplifies the output signal output from their respective photoelectric converter. Thus, when the output signals are reproduced as an image, variations in the characteristics of those constant-current sources appear randomly in the reproduced image; that is, such variations do not appear as fixed-pattern noise as in a solid-state image-sensing device in which constant-current sources are provided one for each output signal line, i.e. one for each column. Since the human eye does not recognize such variations so clearly as it does fixed-pattern noise, the reproduced image appears free from variations.

Moreover, according to the present invention, the current signals output from the individual pixels are directly sampled and held by holding circuits. This helps prevent fixed-pattern noise that appears as vertical stripes in the reproduced image as when signals that are voltage-amplified by using constant-current sources and resistors provided column by column are sampled and held as conventionally practiced.

What is claimed is:

1. A solid-state image-sensing device comprising:
   a plurality of pixels arranged in a matrix and each generating an electric signal proportional to an amount of incident light;
   a plurality of selector circuits provided one for each column of the matrix of the pixels and each having a non-differential buffer, the selector circuits each receiving, from a plurality of pixels belonging to a corresponding column of the matrix, image signals and noise signals representing variations in sensitivity and then outputting the image signals and the noise signals alternately through the buffer, the selector circuits each including:
   a first holding circuit for sampling and holding the image signals output from the pixels; and
   a second holding circuit for sampling and holding the noise signals output from the pixels;
   wherein, in each selector circuit, the image signals and the noise signals are first sampled and held in the first and second holding circuits respectively, and are then alternately fed through the buffer, and
   a correction circuit receiving the image signals and the noise signals sequentially from one selector circuit after another and correcting the image signals on a basis of the noise signals, the correction circuit including:
   a third holding circuit for sampling and holding the image signals output from the first holding circuits provided in the selector circuits;
   a fourth holding circuit for sampling and holding the noise signals output from the second holding circuits provided in the selector circuits; and
   a differential amplifier for outputting the image signals after correcting the image signals by subtracting the noise signals output from the fourth holding circuit from the image signals output from the third holding circuit.

2. A solid-state image-sensing device as claimed in claim 1, further comprising:
   a plurality of constant-current sources provided one for each column of the matrix and each supplying a constant current to pixels belonging to a corresponding column of the matrix.

3. A solid-state image-sensing device as claimed in claim 1, wherein the electric signal output from each pixel is natural-logarithmically proportional to the amount of incident light.

* * * * *